United States Patent
Yamada

(10) Patent No.: US 8,346,146 B2
(45) Date of Patent: Jan. 1, 2013

(54) BELT DRIVING DEVICE, FIXING DEVICE, AND IMAGE FORMING APPARATUS

(75) Inventor: Masamichi Yamada, Yokohama (JP)

(73) Assignee: Ricoh Company, Ltd., Toyko (JP)

( * ) Notice: Subject to any disclaimer, the term of this patent is extended or adjusted under 35 U.S.C. 154(b) by 389 days.

(21) Appl. No.: 12/656,348

(22) Filed: Jan. 27, 2010

(65) Prior Publication Data

US 2010/0189477 A1    Jul. 29, 2010

(30) Foreign Application Priority Data

Jan. 27, 2009   (JP) .................................. 2009-015389

(51) Int. Cl.
   *G03G 15/20*   (2006.01)
(52) U.S. Cl. ........................................................ 399/329
(58) Field of Classification Search .................. 399/329, 399/122, 162, 164, 165
   See application file for complete search history.

(56) References Cited

U.S. PATENT DOCUMENTS

| | | | |
|---|---|---|---|
| 6,078,766 A * | 6/2000 | Kurotaka | 399/165 |
| 6,088,558 A | 7/2000 | Yamada et al. | |
| 6,091,926 A | 7/2000 | Yamada | |
| 6,351,619 B1 | 2/2002 | Yamada | |
| 6,553,204 B1 | 4/2003 | Yamada | |
| 6,577,840 B2 | 6/2003 | Hachisuka et al. | |
| 6,865,363 B2 | 3/2005 | Hachisuka et al. | |
| 6,925,280 B2 | 8/2005 | Yamada | |
| 7,133,636 B2 * | 11/2006 | Yokoi et al. | 399/328 |
| 7,228,096 B2 | 6/2007 | Yamada | |
| 7,359,664 B2 | 4/2008 | Yamada | |
| 2001/0003562 A1 | 6/2001 | Hachisuka et al. | |
| 2003/0053830 A1 | 3/2003 | Hachisuka et al. | |
| 2003/0215270 A1 | 11/2003 | Yamada | |
| 2005/0276638 A1 | 12/2005 | Yamada | |
| 2005/0277048 A1 | 12/2005 | Tomita | |
| 2006/0045590 A1 | 3/2006 | Yamada | |

(Continued)

FOREIGN PATENT DOCUMENTS

CN    1707371    12/2005

(Continued)

OTHER PUBLICATIONS

Abstract of JP 11-065336 published on Mar. 5, 1999.

(Continued)

*Primary Examiner* — Walter L Lindsay, Jr.
*Assistant Examiner* — Rodney Bonnette
(74) *Attorney, Agent, or Firm* — Harness, Dickey & Pierce, P.L.C.

(57) ABSTRACT

A belt driving device including a rotatable seamless belt wound around rotatable driven rollers and one or multiple rollers, and a driven roller unit including the rotatable driven rollers. The driven roller unit includes a detection roller rotatably driven, a surface of which contacts an inner surface of the belt to slide in a direction of a rotary shaft thereof when shifting occurs on the belt in a width direction thereof; a correction roller rotatably driven, a rotary shaft of which is rotatably supported to displace around any single point on the rotary shaft thereof while a surface thereof contacts the inner surface of the belt; and a conversion unit to convert displacement of the detection roller in the direction of the rotary shaft of the detection roller into angular displacement of the correction roller in a direction of rotation of the correction roller.

22 Claims, 15 Drawing Sheets

U.S. PATENT DOCUMENTS

| | | | |
|---|---|---|---|
| 2006/0233578 A1* | 10/2006 | Maki et al. | 399/388 |
| 2007/0172272 A1* | 7/2007 | Miyata et al. | 399/329 |
| 2007/0272512 A1* | 11/2007 | Maki | 198/339.1 |
| 2008/0080909 A1 | 4/2008 | Yamada | |
| 2008/0260424 A1 | 10/2008 | Hara et al. | |
| 2009/0003897 A1 | 1/2009 | Yamada | |
| 2009/0148200 A1* | 6/2009 | Hara | 399/302 |

FOREIGN PATENT DOCUMENTS

| | | |
|---|---|---|
| JP | 3734121 | 1/2006 |
| JP | 2006-225130 | 8/2006 |
| JP | 4260066 | 4/2009 |

OTHER PUBLICATIONS

Abstract of JP 2005-343577 published on Dec. 15, 2005.

Office Action dated Mar. 12, 2012 issued in corresponding Chinese Application No. 201010003172.6.

* cited by examiner

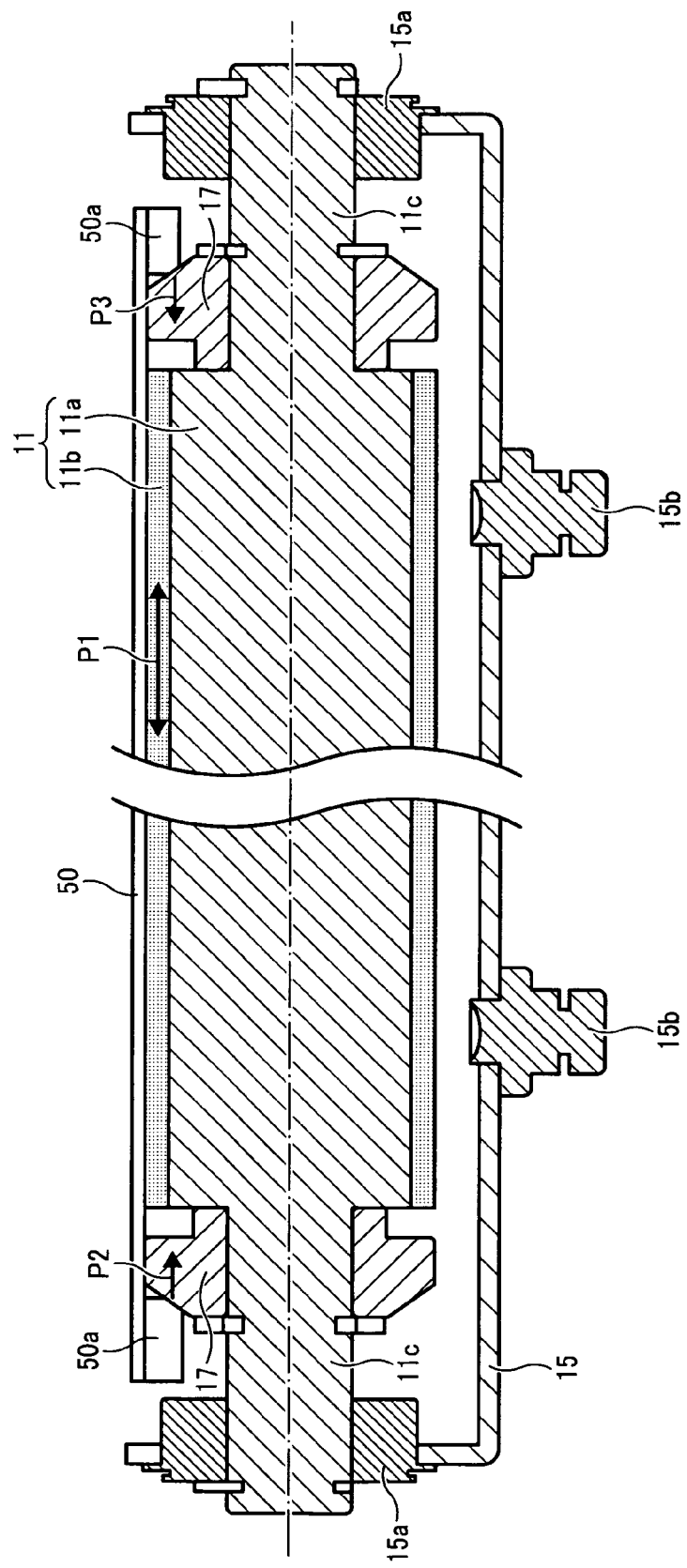

BELT DRIVING DEVICE, FIXING DEVICE, AND IMAGE FORMING APPARATUS

PRIORITY STATEMENT

The present patent application claims priority from Japanese Patent Application No. 2009-015389, filed on Jan. 27, 2009 in the Japan Patent Office, which is hereby incorporated herein by reference in its entirety.

BACKGROUND

1. Technical Field

Illustrative embodiments described in this patent specification generally relate to a belt driving device to rotate a belt; a fixing device using the belt driving device to convey a recording medium and to apply heat to the recording medium; and an image forming apparatus including the fixing device.

2. Description of the Related Art

Related-art image forming apparatuses, such as copiers, printers, facsimile machines, or multifunction devices having two or more of copying, printing, and facsimile functions, typically form a toner image on a recording medium (e.g., a sheet) according to image data using an electrophotographic method. In such a method, for example, a charger charges a surface of an image carrier (e.g., a photoconductor); an irradiating device emits a light beam onto the charged surface of the photoconductor to form an electrostatic latent image on the photoconductor according to the image data; a developing device develops the electrostatic latent image with a developer (e.g., toner) to form a toner image on the photoconductor; a transfer device transfers the toner image formed on the photoconductor onto a sheet; and a fixing device applies heat and pressure to the sheet bearing the toner image to fix the toner image onto the sheet. The sheet bearing the fixed toner image is then discharged from the image forming apparatus.

The fixing device generally includes a rotatable fixing roller or a rotatable fixing belt, each heated, and a rotatable pressure roller or a rotatable pressure belt each pressed against the fixing roller or the fixing belt. A recording medium such as a sheet having an unfixed toner image thereon passes through a nip formed between the fixing roller or the fixing belt and the pressure roller or the pressure belt, so that heat and pressure is applied to the toner image to melt and fix the toner image onto the sheet.

In keeping with recent trends toward reducing energy consumption, a fixing device having a smaller heat capacity is more widely used than a heat storage-type fixing device using a fixing member with a higher heat capacity in which a larger amount of electricity is required. Accordingly, a fixing device having a seamless fixing belt with a smaller heat capacity and a fixing roller including a heat insulating silicone foam or the like has become common in recent years, compared to a fixing device having a fixing roller with a large heat capacity.

The temperature of the fixing belt with a smaller heat capacity can be raised to a target temperature more quickly at startup of the fixing device, thereby reducing warm-up time for the fixing device. Therefore, the fixing belt with a smaller heat capacity is essential for the fixing device to save energy.

As for the construction of the fixing belt, typically a seamless polyimide resin having high heat resistance and strength and low thermal expansion is widely used as a substrate of the fixing belt. A surface layer of the substrate is often coated with an elastic layer formed of silicone rubber or the like, and a fluorinated tube having a superior releasing ability from toner is often further provided as an outermost layer of the fixing belt.

In the fixing device having the above-described configuration, a slight shift in the alignment of multiple rollers around which the fixing belt is wound and the action of the nip formed between the fixing roller and the pressure roller with the fixing belt therebetween can cause axial shifting of the fixing belt. Preventing shifting of the fixing belt is an important problem to be solved for the fixing device.

In particular, growing market demand for an ability to handle various different types of recording media and for greater productivity regardless of the types of the recording media has resulted in a wider nip formed between the fixing roller and the pressure roller. Consequently, shifting of the fixing belt more often occurs at the nip between the fixing roller and the pressure roller, and as a result, the problem of preventing shifting of the fixing belt assumes even greater importance.

To solve the problem, one example fixing device is proposed in which a driving roller and a driven roller are provided with a fixing belt therebetween, and the driven roller is movable in a thrust direction of a rotary shaft thereof. An angle of the rotary shaft of the driven roller relative to the driving roller is changed as the driven roller moves. The above-described fixing device may solve the problem of shifting of the fixing belt caused by twisting of the rollers around which the fixing belt is wound. However, shifting of the fixing belt caused by the action of the nip formed between the fixing roller and the pressure roller with the fixing belt therebetween may not be solved by the above-described fixing device because it is assumed that, in the above-described fixing device, shifting of the fixing belt is corrected only when the movement of the driven roller in the thrust direction is in the opposite direction from the shifting of the fixing belt. Therefore, shifting of the fixing belt caused by factors other than twisting of the rollers cannot be solved by the above-described fixing device.

Another approach is a fixing device having a fixing belt wound around a driving roller and a driven roller swingably provided at substantially the center of the driving roller. The driven roller swings when shifting of the fixing belt occurs to prevent shifting of the fixing belt, taking advantage of the fact that the fixing belt tends to move to the side having greater tension.

However, although shifting of the fixing belt can be prevented by the above-described approach when the fixing belt is elastic such as a rubber belt, a heat-resistant resin belt having a polyimide substrate widely used in recent fixing devices does not have the requisite elasticity. Therefore, shifting of a fixing belt lacking the requisite elasticity cannot be solved by the above-described approach.

Further, because the inner diameter of the fixing belt is the same as the diameter of the rotary shaft of the driven roller, a mechanism in which the driven roller swings when shifting of the fixing belt occurs does not operate as desired, and cannot solve the problem.

Yet another approach is a belt driving device including an endless belt; a driven roller; a shifting detector movable in a direction of a shaft of the driven roller and provided at least one end of the shaft of the driven roller to detect shifting of the endless belt; a support member to support the ends of the shaft of the driven roller such that the driven roller is movable in a direction perpendicular to the shaft thereof; and conversion means for converting displacement of the ends of the shaft of the driven roller into movement in a direction descending from a direction of shifting of the endless belt, that is, a predetermined direction perpendicular to the direction of the shaft of the driven roller, when the shifting detector detects movement of the endless belt to the shaft of the driven roller.

The conversion means includes a belt guide member and a guide member having a slope. The endless belt is guided along the belt guide member by a smaller force at a position where the endless belt is displaced to the predetermined direction to prevent shifting of the endless belt.

However, because the endless belt and the belt guide member, and the guide member and the belt guide member of the conversion means, contact each other at one point, respectively, abrasion occurs at the portions where the endless belt and the belt guide member, and the guide member and the belt guide member, contact each other, respectively, in continuing use. Further, because the belt guide member is formed of a resin for the purpose of preventing damage to the endless belt, durability of the belt guide member is a concern.

SUMMARY

In view of the foregoing, illustrative embodiments described herein provide a durable belt driving device capable of inexpensively and reliably preventing shifting and meandering of a fixing belt, a fixing device including the belt driving device, and an image forming apparatus using the fixing device.

At least one embodiment provides a belt driving device including a rotatable seamless belt wound around rotatable driven rollers and one or multiple rollers, and a driven roller unit including the rotatable driven rollers. The driven roller unit includes a detection roller rotatably driven, a surface of which contacts an inner surface of the belt to slide in a direction of a rotary shaft thereof when shifting occurs on the belt in a width direction thereof; a correction roller rotatably driven, a rotary shaft of which is rotatably supported to displace around any single point on the rotary shaft thereof while a surface thereof contacts the inner surface of the belt; and a conversion unit to convert displacement of the detection roller in the direction of the rotary shaft of the detection roller into angular displacement of the correction roller in a direction of rotation of the correction roller.

At least one embodiment provides a fixing device including the belt driving device described above. The fixing device includes the belt including a fixing belt to fix unfixed toner to a recording medium, the one or multiple rollers including a fixing member, a heat member including a heat source provided in an inner circumference of the fixing belt to heat the fixing belt, and a pressure member pressed against the fixing member with the fixing belt therebetween to form a fixing nip.

At least one embodiment provides a belt driving device including a rotatable seamless belt wound around rotatable driven rollers and one or multiple rollers, and a driven roller unit including the rotatable driven rollers. The belt includes two ribs sequentially protruding toward an inner circumference of the belt at two positions on an inner surface of the belt in a width direction thereof. The driven roller unit includes a detection unit including two detection rings provided in the inner circumference of the belt, surfaces of which contact surfaces of the two ribs, respectively, and a support shaft supporting the two detection rings to slide in a direction of the support shaft when shifting of the belt in the width direction of the belt is transmitted by the two detection rings. The driven roller unit further include a correction roller rotatably driven, a rotary shaft of which is rotatably supported to displace around any single point on the rotary shaft thereof while a surface thereof contacts the inner surface of the belt; and a conversion unit to convert displacement of the support shaft of the detection unit in the direction of the support shaft into displacement of the correction roller in a direction of rotation of the correction roller.

At least one embodiment provides a fixing device including the belt driving device described above. The fixing device includes the belt including a fixing belt to fix unfixed toner to a recording medium, the one or multiple rollers including a fixing member, a heat member including a heat source provided in an inner circumference of the fixing belt to heat the fixing belt, and a pressure member pressed against the fixing member with the fixing belt therebetween to form a fixing nip.

At least one embodiment provides an image forming apparatus including the belt driving device described above.

Additional features and advantages of the illustrative embodiments will be more fully apparent from the following detailed description, the accompanying drawings, and the associated claims.

BRIEF DESCRIPTION OF THE DRAWINGS

A more complete appreciation of the illustrative embodiments described herein and the many attendant advantages thereof will be readily obtained as the same becomes better understood by reference to the following detailed description when considered in connection with the accompanying drawings, wherein:

FIG. 5 is a cross-sectional view illustrating structures of a fixing belt, the detection roller, a detection bracket, and so forth cut along a line A-A in FIG. 1;

Figure 1:
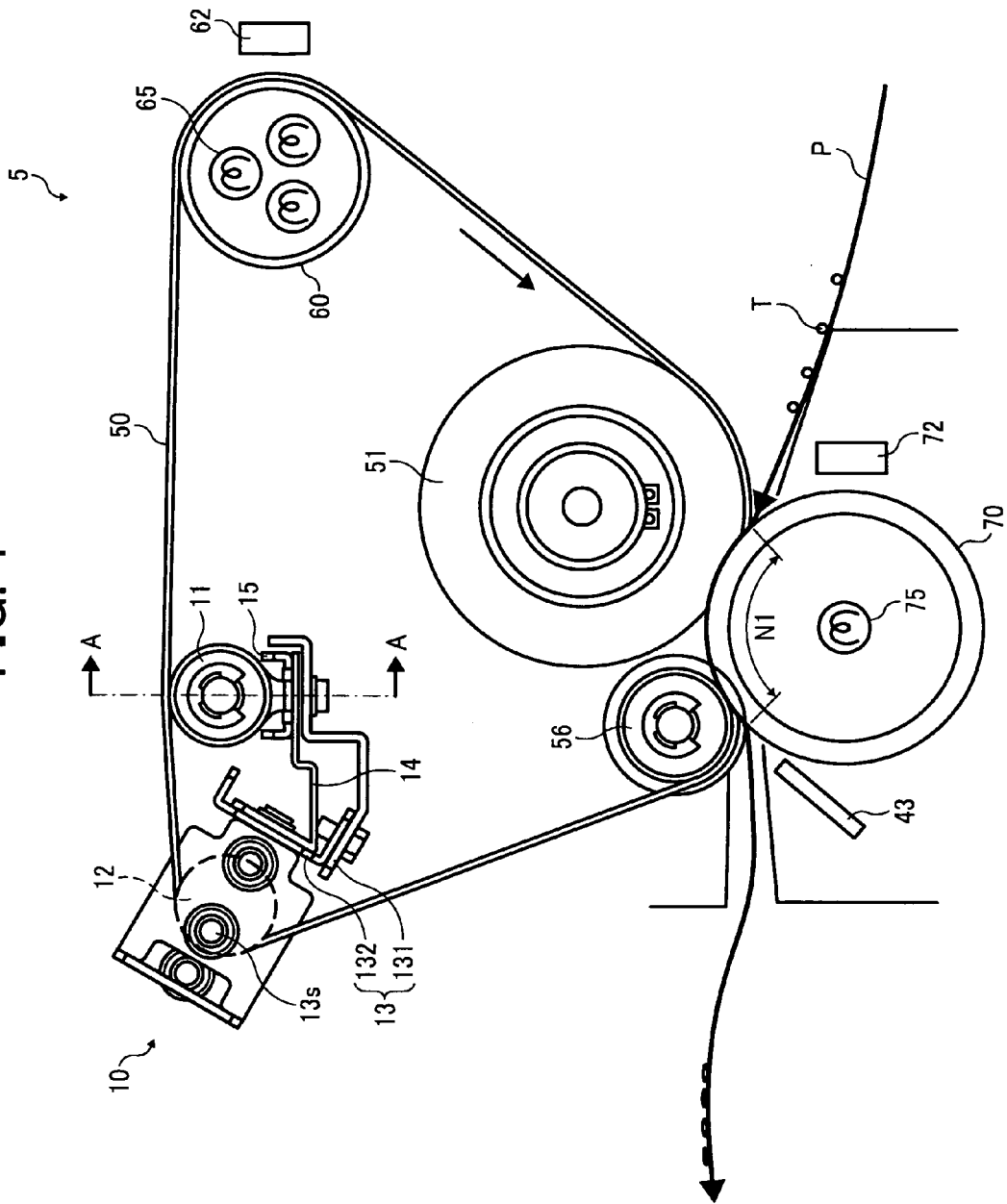
FIG. 1 is a vertical cross-sectional view illustrating an example of a configuration of a fixing device according to illustrative embodiments.

The accompanying drawings are intended to depict illustrative embodiments and should not be interpreted to limit the scope thereof. The accompanying drawings are not to be considered as drawn to scale unless explicitly noted.

DETAILED DESCRIPTION OF ILLUSTRATIVE EMBODIMENTS

In describing illustrative embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

Reference is now made to the drawings, wherein like reference numerals designate identical or corresponding parts throughout the several views.

A description is now given of a belt driving device and a fixing device according to illustrative embodiments.

FIG. 1 is a vertical cross-sectional view illustrating an example of a configuration of a fixing device 5 according to illustrative embodiments.

The fixing device 5 includes a cylindrical fixing roller 51; a separation roller 56; a driven roller unit 10; a heat roller 60; a fixing belt 50 wound around the fixing roller 51, the separation roller 56, driven rollers included in the driven roller unit 10, and the heat roller 60 with a predetermined amount of tension; and a pressure roller 70 rotatably pressed against the fixing belt 50 to form a fixing nip N1. Specifically, the pressure roller 70 is pressed against both the fixing roller 51 and the separation roller 56 with the fixing belt 50 therebetween so that the fixing nip N1 includes two nips respectively formed between the pressure roller 70 and the fixing roller 51 and between the pressure roller 70 and the separation roller 56. A separation member 43, a leading edge of which is positioned closer to the pressure roller 70, is provided at an exit of the fixing nip N1 to separate a recording medium such as a sheet conveyed through the fixing nip N1 from the pressure roller 70.

The fixing belt 50 is a seamless belt for fixing unfixed toner T to the recording medium (hereinafter referred to as a sheet P). The fixing belt 50 has a multi-layered structure, in which an elastic layer such as a silicone rubber layer is laminated onto a substrate formed of a material such as nickel, stainless steel, or polyimide. For example, the substrate may be formed of a polyimide resin having an inner diameter of 140 mm and a thickness of 90 μm, and silicone rubber having a thickness of 200 μm is laminated onto the substrate. Further, the silicone rubber may be coated with a PFA (tetrafluoroethylene-perfluoroalkyl vinyl ether copolymer) having a thickness of 20 μm, so that the PFA is provided as an outermost layer of the fixing belt 50.

The fixing roller 51 includes a hollow cylindrical substrate roller and a heat-resistant elastic layer formed of a material such as silicone foam rubber provided around the outside of the hollow cylindrical substrate roller. For example, a heat-resistant elastic layer formed of silicone foam rubber having a thickness of 14 mm may be provided around the hollow cylindrical substrate roller to provide the fixing roller 51 with an outer diameter of 60 mm.

The separation roller 56 includes a metal core within which a heat pipe is provided, and the metal core is coated with a fluorine resin. For example, an outer diameter of the separation roller 56 may be 20 mm.

The driven roller unit 10 includes multiple driven rollers also functioning as tension rollers. Configuration and functions of the driven roller unit 10 are described in detail later.

The heat roller 60 is a hollow cylindrical roller formed of aluminum or iron and having, for example, an outer diameter of 35 mm and a thickness of 0.6 mm. The heat roller 60 includes a heater 65 such as a halogen heater serving as a heat source for heating the fixing belt 50. The heat roller 60 is provided within an inner circumference of the fixing belt 50 such that the heat roller 60 is not pressed against the pressure roller 70. In other words, the heat roller 60 is provided at a position such that the heat source is not provided at the fixing nip N1. It is to be noted that an induction heating (IH) mechanism may be alternatively used as the heat source. The fixing device 5 further includes a temperature detector 62 for detecting temperature at the point of contact between the fixing belt 50 and the heat roller 60.

The pressure roller 70 is a cylindrical roller in which an elastic layer formed of a material such as silicone rubber is provided around a metal core formed of aluminum or iron. For example, a hollow metal core formed of steel and having a thickness of 1 mm may be coated with silicone rubber having a thickness of 1.5 mm, and a PFA tube is provided around the outside of the silicone rubber as the outermost layer of the pressure roller 70, so that the pressure roller 70 having an outer diameter of 50 mm is provided. The pressure roller 70 has a heater 75 inside thereof, and the heater 75 is controlled to be turned on and off based on a temperature of the pressure roller 70 detected by a temperature detector 72. Accordingly, heat is not moved from the sheet P passing through the fixing nip N1 to the pressure roller 70.

Figure 2:
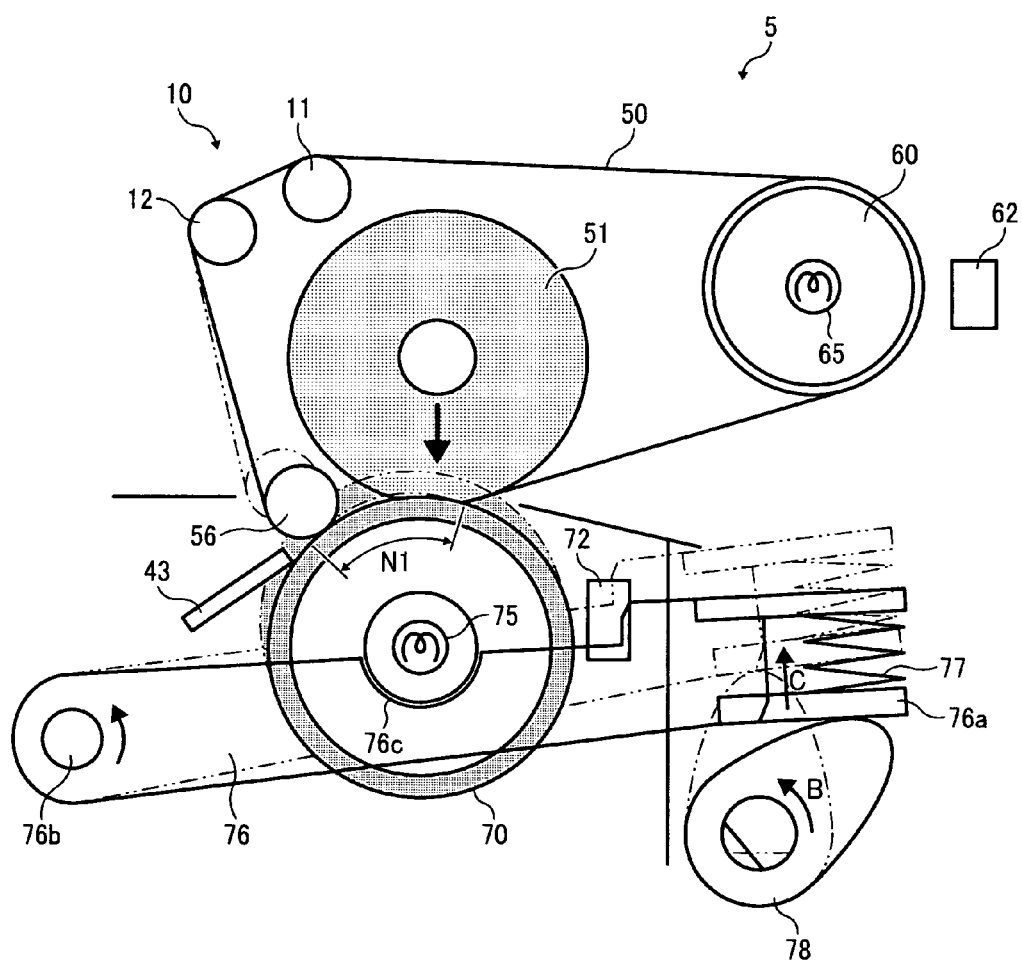
FIG. 2 is a vertical cross-sectional view illustrating a configuration of pressing means in the fixing device illustrated in FIG. 1.

FIG. 2 is a vertical cross-sectional view illustrating a configuration of pressing means included in the fixing device 5. As illustrated in FIG. 2, the pressure roller 70 is provided with pressing means including a pressure lever 76, a spring 77, a pressure member 76a, and a cam 78. FIG. 2 illustrates states in which an amount of pressure at the fixing nip N1 is maximized and minimized, respectively, by rotation of the cam 78. Specifically, in FIG. 2, the state in which the amount of pressure at the fixing nip N1 is maximized is indicated by broken lines, and the state in which the amount of pressure at the fixing nip N1 is minimized is indicated by solid lines.

The pressure roller 70 is pressed against the fixing roller 51 by the pressing means as follows. First, when the cam 78 is rotated at a certain angle in a direction of arrow B in FIG. 2 by a driving force external to the pressing means and not shown, the cam 78 pushes the pressure member 76a upward as indicated by arrow C in FIG. 2. When the pressure member 76a is pushed upward, the spring 77 affixed to the end of the pressure member 76a pushes an end of the pressure lever 76 on the spring 77 side upward with a certain amount of pressure. Subsequently, the pressure lever 76 is rotated around a support shaft 76b in a counterclockwise direction in FIG. 2. Thereafter, a pressing part 76c provided at an intermediate position between the end of the pressure lever 76 on the spring 77 side and the support shaft 76b contacts a shaft of the pressure roller 70 to press the pressure roller 70 against the fixing roller 51. Accordingly, the pressure roller 70 contacts and is pressed against the fixing roller 51 with the fixing belt 50 therebetween with a certain amount of pressure to form the fixing nip N1 for fixing the toner T on the sheet P. It is to be noted that, alternatively, the spring 77 may be omitted from the pressing means. In such a case, the cam 78 is designed to directly push the end of the pressure lever 76 upward.

The pressure roller 70 digs into the fixing roller 51 to a certain depth, for example, from 3 mm to 3.5 mm, with the fixing belt 50 therebetween. Further, the pressure roller 70 is pressed against the separation roller 56 with a certain amount of pressure, for example, a force of 10 Kgf on one side. Accordingly, the fixing nip N1 has a predetermined width of, for example, about 30 mm.

When the fixing device 5 is driven, the fixing belt 50 is rotated in a direction of conveyance of the sheet P, that is, a clockwise direction in FIG. 1, by rotation of the fixing roller 51 and the separation roller 56 in a clockwise direction in FIG. 1 with an appropriate tension applied by a detection roller 11 and a correction roller 12. At the same time, the pressure roller 70 is rotated as the fixing belt 50 rotates. It is to be noted that, alternatively, the pressure roller 70 or the heat roller 60 may be rotatively driven. During fixing of the toner T to the sheet P, the fixing belt 50 is heated by the heater 65 provided inside the heat roller 60 until a temperature detected by the temperature detector 62 reaches a predetermined temperature, for example, a temperature appropriate for fixing the toner T to the sheet P.

Subsequently, the sheet P having the unfixed toner T thereon is conveyed to the fixing nip N1 from right to left in FIG. 1, and the toner T is melted and fixed to the sheet P by pressure and heat applied thereto at the fixing nip N1.

Pressure at each of an entrance of the fixing nip N1 in the direction of conveyance of the sheet P, that is, a portion where the pressure roller 70 and the fixing roller 51 contact each other, and an exit of the fixing nip N1 in the direction of conveyance of the sheet P, that is, a portion where the pressure roller 70 and the separation roller 56 contact each other, is set in a range between 15 $N/cm^2$ and 30 $N/cm^2$. Pressure at an intermediate portion between the entrance and the exit of the fixing nip N1 is set in a range between 5 $N/cm^2$ and 15 $N/cm^2$.

The toner T is mostly fixed to the sheet P at the entrance of the fixing nip N1. Because the toner T is sufficiently melted and is highly viscous at that time, the sheet P tends to adhere to the fixing belt 50 while passing through the intermediate portion of the fixing nip N1. At this time, a pressure of 5 $N/cm^2$ or more is required to keep the sheet P at that position on the fixing belt 50 while the sheet P is conveyed. In addition, a pressure at the intermediate portion of the fixing nip N1 is kept to 15 $N/cm^2$ or less so that glossiness is not imparted to the toner T on the sheet P. When the sheet P is discharged from the fixing nip N1, the separation roller 56 having a smaller diameter and a strong curvature separates the sheet P from the fixing belt 50. Further, the sheet P is separated from the pressure roller 70 by the separation member 43 to be discharged from the fixing nip N1.

A total period of time in which the sheet P is pressed between the fixing roller 51 and the pressure roller 70 and between the separation roller 56 and the pressure roller 70 at the fixing nip N1 in the fixing device 5 is 60 m/sec or longer, and a half or more of all the width of the fixing nip N1 has a pressure in a range between 15 $N/cm^2$ and 30 $N/cm^2$. Accordingly, the toner T on the sheet P including heavy paper having a weight of about 300 $g/m^2$ can be sufficiently fixed to the sheet P by the fixing device 5.

The width of the fixing nip N1 at the intermediate portion thereof can be adjusted by changing a contact state on the fixing belt 50 between the fixing roller 51 and the pressure roller 70. When the sheet P having a weight equal to or less than that of regular paper is used, the contact state between the fixing roller 51 and the pressure roller 70 is adjusted to increase the width of the fixing nip N1 at the intermediate portion with pressure in a range between 5 $N/cm^2$ and 15 $N/cm^2$. In a case in which heat supply is increased when a thin sheet such as regular paper is used, an amount of pressure at the intermediate portion of the fixing nip N1 is reduced to prevent an increase in glossiness of the toner T on the sheet P. Accordingly, in a non-gloss mode to be described in detail later, a degree of glossiness that is the same as that of a toner image formed on heavy paper may be reliably kept for a toner image formed on a sheet having a weight equal to or less than that of regular paper by adjusting the width of the fixing nip N1 even though such a sheet tends to have an excessive amount of heat. By contrast, in a gloss mode also to be described in detail later, the width of the fixing nip N1 at the intermediate portion thereof is adjusted based on a thickness of the sheet P so that a certain degree of glossiness is reliably imparted to the toner T on the sheet P regardless of types of sheets. As a result, reliability of imparting a desired degree of glossiness to the toner T on the sheet P can be improved in both the gloss mode and the non-gloss mode.

The fixing device 5 serves as the belt driving device including the driven roller unit 10 having rotatable driven rollers to correct shifting and meandering of the fixing belt 50, and the seamless fixing belt 50 that is rotated by driving of a driving mechanism, not shown, and is wound around the driven rollers of the driven roller unit 10 and one or multiple rollers such as the fixing roller 51 and the separation roller 56.

As illustrated in FIG. 1, the driven roller unit 10 includes the detection roller 11, the correction roller 12, and a conversion means. The detection roller 11 is a rotatable driven roller, and the surface thereof contacts the inner surface of the fixing belt 50. The detection roller 11 is slidable in a direction of the rotary shaft thereof along with shifting of the fixing belt 50 in the width direction of the fixing belt 50. The correction roller 12 is a rotatable driven roller, and is supported such that the rotary shaft thereof is slidable around any point on the rotary shaft thereof while the surface thereof contacts the inner surface of the fixing belt 50. The conversion means converts displacement of the detection roller 11 in the direction of the rotary shaft thereof into angular displacement of the correction roller 12. Accordingly, in the driven roller unit 10, shifting and meandering of the fixing belt 50 rotated by the driven rollers including the fixing roller 51, the separation roller 56, and/or the pressure roller 70 can be detected by the detection roller 11, and the correction roller 12 compensates shifting and meandering of the fixing belt 50 so that shifting and meandering of the fixing belt 50 axially in the width direction of the fixing belt 50 can be controlled.

Figure 3A:
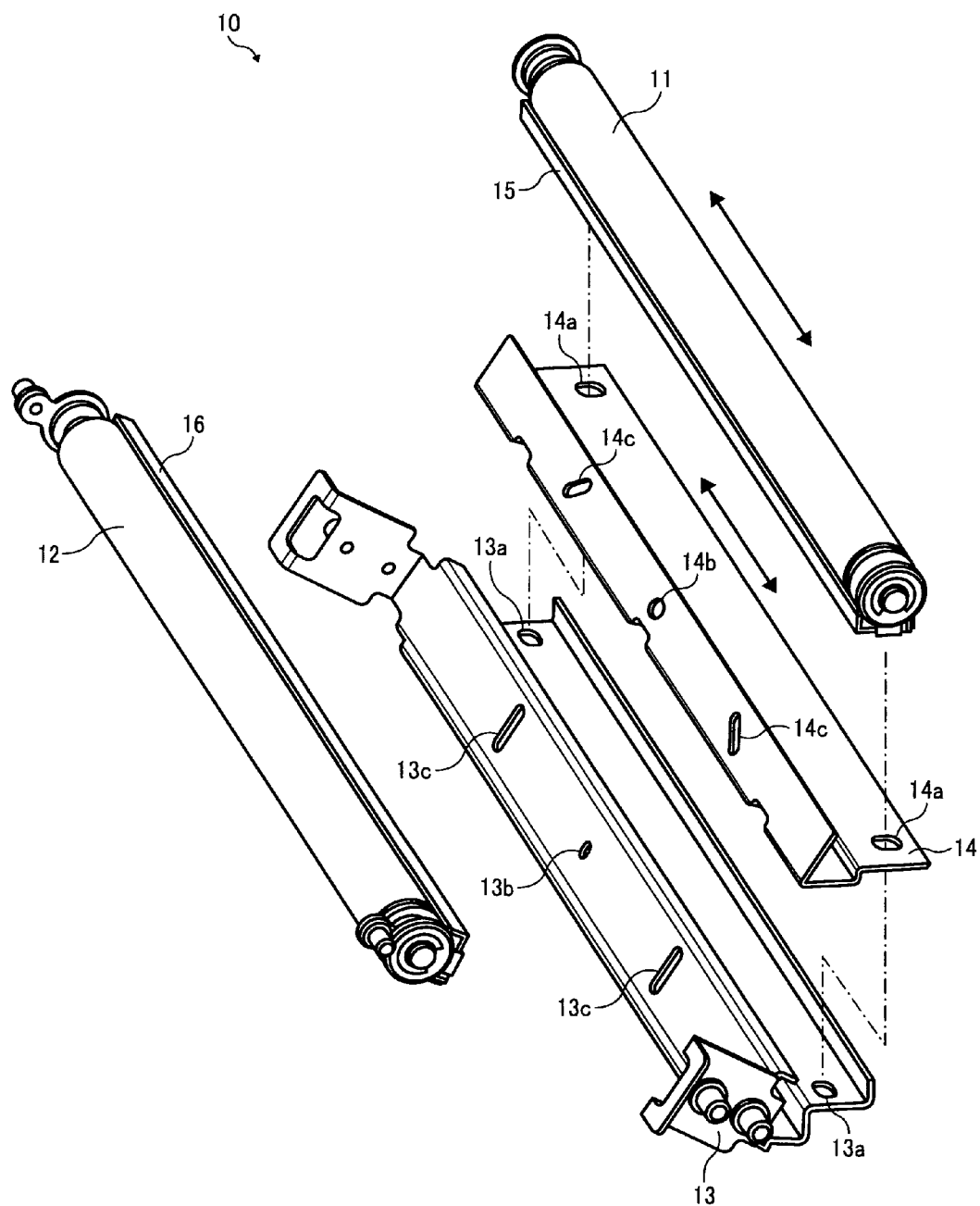
FIGS. 3A and 3B are exploded views respectively illustrating a configuration of a driven roller unit.
Figure 3B:
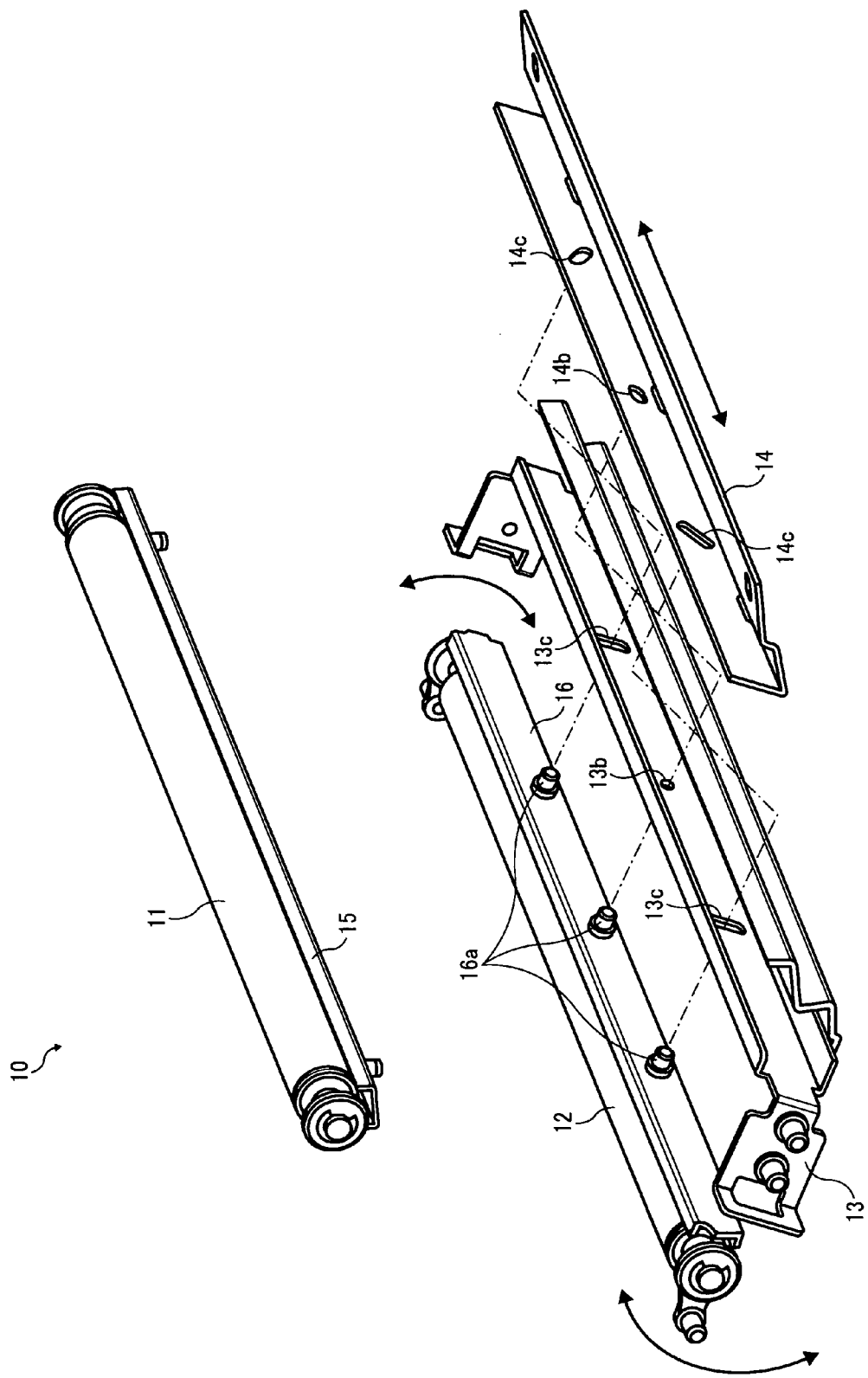

FIGS. 3A and 3B are exploded views illustrating a configuration of the driven roller unit 10 viewed from different angles, respectively. Each of a reference bracket 13, a conversion member 14, a detection bracket 15, and a correction bracket 16 illustrated in FIGS. 3A and 3B is processed sheet metal such as iron or the like, and has a longitudinal direction thereof in a direction parallel to the rotary shaft of each of the detection roller 11 and the correction roller 12.

As illustrated in FIG. 3A, the detection roller 11 is rotatably supported by the detection bracket 15 through bearings respectively provided at both ends of the detection bracket 15 in the longitudinal direction thereof. The detection bracket 15 is integrally formed with the conversion member 14, and is provided such that the detection bracket 15 can be moved together with the conversion member 14 in the direction of the rotary shaft of the detection roller 11 relative to the reference bracket 13. As illustrated in FIG. 1, the reference bracket 13 includes two processed sheet metals 131 and 132 connected to each other. A support pin 13s is supported by a housing of the fixing device 5, and serves as a reference of movement of the detection roller 11 and the correction roller 12 in the belt driving device.

As illustrated in FIG. 3B, the correction roller 12 is rotatably supported by the correction bracket 16 through bearings respectively provided at both ends of the correction bracket 16 in the longitudinal direction thereof. Three shafts 16a each having a stud pin provided side by side on a bottom surface of the correction bracket 16 in the longitudinal direction thereof are inserted into three corresponding holes including a reference hole 13b and two slots 13c provided on the reference bracket 13, respectively, and are further inserted into slots including a reference slot 14b and slots 14c provided in the conversion member 14, respectively. As described in detail later, the correction bracket 16 is designed to be rotated around a shaft 16a provided at the center of the three shafts 16a (hereinafter referred to as a center shaft 16a) together with the correction roller 12 such that the correction bracket 16 and the rotary shaft of the correction roller 12 are rotatable in both clockwise and counterclockwise directions in FIG. 3B.

Figure 4:
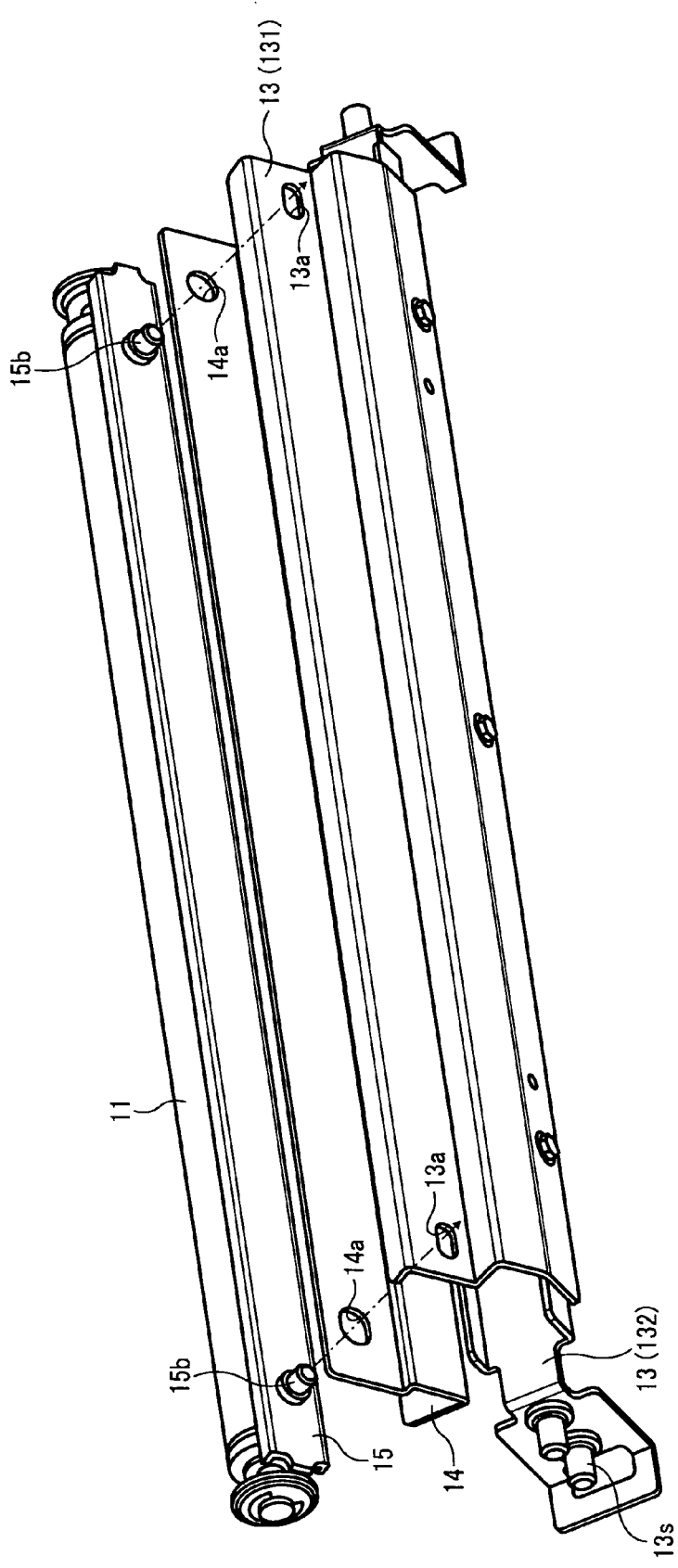
FIG. 4 is an exploded view illustrating a configuration of a detection roller.

FIG. 4 is an exploded view illustrating a configuration of the detection roller 11.

The detection bracket 15, the conversion member 14, and the reference bracket 13 are superimposed on the detection roller 11 in that order to have the same longitudinal direction. A folded portion of the reference bracket 13 extending in the longitudinal direction thereof, that is, the direction of the rotary shaft of the detection roller 11, serves as a guide rail so that the conversion member 14 can slide on the folded portion of the reference bracket 13 in the direction of the rotary shaft of the detection roller 11. The detection bracket 15 that rotatably supports the detection roller 11 has two shafts 15b including two stud pins swaged into the bottom surface of the detection bracket 15 at two positions in the longitudinal direction thereof, respectively. The two shafts 15b are inserted into two reference holes 14a each having the same diameter as that of the shafts 15b provided on the conversion member 14, and are respectively further inserted into the two slots 13a provided on the reference bracket 13 in the longitudinal direction thereof, that is, the direction of the rotary shaft of the detection roller 11. Accordingly, when an external force acts on the detection roller 11 in the direction of the rotary shaft of the detection roller 11, the external force is transmitted to the detection bracket 15 through the bearings of the detection roller 11, and is further transmitted to the conversion member 14 through the shafts 15b inserted into the reference holes 14a. As a result, the detection roller 11, the detection bracket 15, and the conversion member 14 integrally slide on the guide rail of the reference bracket 13 so that positions thereof are integrally displaced in the direction of the rotary shaft of the detection roller 11 within a range of a longer diameter of the slots 13a.

It is to be noted that, in the fixing device 5, the external force acting on the detection roller 11 is received by the detection roller 11 when the detection roller 11 detects shifting or meandering of the fixing belt 50 in the width direction of the fixing belt 50 during operations of the fixing belt 50. Now, a configuration of means for detecting shifting or meandering of the fixing belt 50 is described in detail below with reference to FIG. 5.

FIG. 5 is a cross-sectional view illustrating structures of the fixing belt 50, the detection roller 11, the detection bracket 15, and so forth cut along a line A-A in FIG. 1. Here, the fixing device 5 uses both first detection means including the detection roller 11 and second detection means including ribs 50a and detection rings 17.

The detection roller 11 includes a cylindrical roller 11a and an elastic layer 11b including an elastic material such as silicone rubber provided around the cylindrical roller 11a. Both ends of a rotary shaft 11c of the detection roller 11 extending in a longitudinal direction of the cylindrical roller 11a are rotatably supported by the detection bracket 15 via bearings 15a. An outer circumferential surface of the detection roller 11 contacts the inner surface of the fixing belt 50 with a predetermined amount of pressure. When shifting of the fixing belt 50 occurs, the detection roller 11 receives an external force P1 in the direction of the rotary shaft of the detection roller 11. Accordingly, as described above, the detection roller 11, the detection bracket 15, and the conversion member 14 integrally slide on the guide rail of the reference bracket 13 due to the external force P1, so that shifting or meandering of the fixing belt 50 can be detected. At the same time, the external force P1 acts on the detection roller 11 while the outer circumferential surface of the detection roller 11 contacts the inner surface of the fixing belt 50, thereby improving durability of the components compared to the configuration of the related art described above in which the components contact each other at only a single point.

The detection roller 11 preferably has the elastic layer 11b around the outside of the cylindrical roller 11a to increase a frictional factor compared to a configuration in which the detection roller 11 has only the cylindrical roller 11a. Accordingly, the fixing belt 50 is prevented from slipping on the detection roller 11 so that shifting of the fixing belt 50 acts as the external force P1. In particular, when the elastic layer 11b includes silicone foam rubber, the fixing belt 50 tends to more easily dig into the silicone foam rubber, that is, the elastic layer 11b, compared to a configuration in which the elastic layer 11b includes solid rubber. As a result, the fixing belt 50 is more reliably prevented from slipping on the detection roller 11 when shifting or meandering of the fixing belt 50 occurs.

The second detection means includes the two linear ribs 50a sequentially protruding toward an inner circumference side of the fixing belt 50 from the inner surface of the fixing belt 50 at two positions in the width direction of the fixing belt 50, that is, both edges of the fixing belt 50 illustrated in FIG. 5. The second detection means further includes the two detection rings 17, surfaces of which contact surfaces of the ribs 50a provided at both edges of the fixing belt 50, respectively, so that shifting of the fixing belt 50 in the width direction thereof is transmitted to the detection roller 11.

Each of the ribs 50a includes a heat resistant wire formed of silicone rubber, fluorocarbon rubber, or the like, and is bonded to a predetermined position of the fixing belt 50 in the width direction thereof such that a longitudinal direction of the ribs 50 is an inner circumferential direction of the fixing belt 50.

The detection rings 17 are provided at both ends of the rotary shaft 11c of the detection roller 11 acting as a support shaft such that the detection rings 17 contact the ribs 50a, respectively, without any space therebetween. The detection rings 17 are not required to be integrally fixed to the rotary shaft 11c as long as the detection rings 17 are supported to be prevented from moving in the direction of the rotary shaft 11c of the detection roller 11. In FIG. 5, the detection rings 17 are inserted into the rotary shaft 11c of the detection roller 11 to contact the cylindrical roller 11a of the detection roller 11, and are prevented from moving in the direction of the rotary shaft 11c of the detection roller 11 at those positions by retaining rings, not shown.

Further, each of the detection rings 17 has a shape of a long conical frustum with a slope of increasing diameter toward the detection roller 11. Each of the ribs 50a has a substantial rectangular cross-section, and a corner of each of the ribs 50a on the detection rings 17 side is cut off, or chamfered. Accordingly, the slope of the long conical frustum of the detection rings 17 and the cut-off portion of the ribs 50a contact each other, so that the detection ring 17 and the rib 50a constantly contact each other at a predetermined portion.

When shifting or meandering of the fixing belt 50 occurs, the detection rings 17 receive the external force in the direction of the rotary shaft 11c of the detection roller 11. For example, referring to FIG. 5, when shifting of the fixing belt 50 in the right direction occurs, the rib 50a at a left edge of the fixing belt 50 acts as an external force P2 in the right direction on the detection ring 17 at a left end of the detection roller 11. By contrast, when shifting of the fixing belt 50 in the left direction occurs, the rib 50a at a right edge of the fixing belt 50 acts as an external force P3 in the left direction on the detection ring 17 at a right edge of the detection roller 11. Thereafter, the external force P2 or P3 is transmitted from the detection rings 17 to the detection roller 11, that is, the cylindrical roller 11a of the detection roller 11. As a result, the detection roller 11, the detection bracket 15, and the conversion member 14 integrally slide on the guide rail of the reference bracket 13, so that shifting or meandering of the fixing belt 50 can be detected. The external force acts on the detection roller 11 while the outer circumferential surface of the detection roller 11 contacts the inner surface of the fixing belt 50, thereby improving durability of the components compared to the configuration of the related art described above in which the components contact each other at only a point.

It is to be noted that either the first or second detection means may be applicable as the means for detecting shifting or meandering of the fixing belt 50 according to illustrative embodiments. Alternatively, both the first and second detection means may be used as illustrated in FIG. 5. In a case in which only the second detection means is used, the cylindrical roller 11a and the elastic layer 11b of the detection roller 11 are omitted, and only the rotary shaft 11c of the detection roller 11 is used. In other words, the second detection means includes the two ribs 50a provided on the inner surface of the fixing belt 50 and the two detection rings 17, the surfaces of which contact the surfaces of the two ribs 50a, respectively, and the rotary shaft 11c that supports the two detection rings 17 at predetermined positions thereon and serves as the support shaft to slide in the direction of the rotary shaft 11c when the two detection rings 17 transmit shifting of the fixing belt 50 in the width direction of the fixing belt 50 to the detection roller 11.

As described above, because the diameter of the slope of each of the detection rings 17 increases toward the detection roller 11, it is difficult for the ribs 50a to climb over the slope even when shifting of the fixing belt 50 occurs, thereby preventing shifting of the fixing belt 50.

A description is now given of the conversion means for converting displacement of the detection roller 11 (or the rotary shaft 11c) in the direction of the rotary shaft 11c of the detection roller 11 into angular displacement of the correction roller 12 in a direction of rotation of the correction roller 12.

Figure 6A:
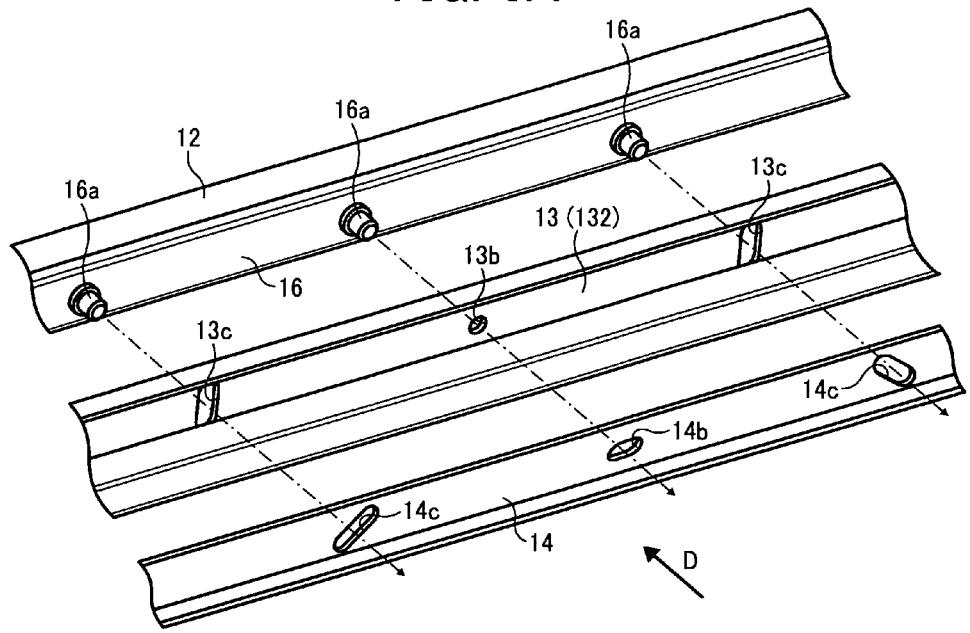
FIG. 6A is an exploded view illustrating a configuration of a correction roller.

FIG. 6A is an exploded view illustrating a configuration of the correction roller 12.

The correction bracket 16, the reference bracket 13, and the conversion member 14 are superimposed on the correction roller 12 in that order with the same longitudinal direction. The correction bracket 16 rotatably supporting the correction roller 12 includes the three shafts 16a each having a stud pin swaged into the bottom surface of the correction bracket 16 at three positions in the longitudinal direction thereof, that is, the direction of the rotary shaft of the correction roller 12.

As described above, the central shaft 16a provided at the center of the three shafts 16a is inserted into the reference hole 13b having a diameter same as that of the central shaft 16a and provided at the center of the reference bracket 13 in the longitudinal direction thereof, and is further inserted into the reference slot 14b provided at the center of the conversion member 14 in the longitudinal direction of the conversion member 14. The reference slot 14b has a longer diameter in the longitudinal direction of the conversion member 14. The shafts 16a at both sides of the central shaft 16a (hereinafter respectively referred to as right and left shafts 16a) are respectively inserted into the two slots 13c respectively provided at both sides of the reference hole 13b of the reference bracket 13. Each of the slots 13c has a longer diameter in a direction perpendicular to the longitudinal direction of the reference bracket 13. The right and left shafts 16a are further inserted into the two slots 14c provided at both sides of the reference slot 14b of the conversion member 14. Each of the slots 14c has a longer diameter in a direction tilted at a predetermined angle relative to the longitudinal direction of the conversion member 14. The two slots 14c are tilted in a direction opposite to each other relative to the longitudinal direction of the conversion member 14. Specifically, when viewed from a side indicated by an arrow D in FIG. 6A, a relative position of the right and left slots 14c has an inverted V-shape. Accordingly, the correction roller 12 and the correction bracket 16 are rotatable around the central shaft 16a, that is, the reference hole 13b of the reference bracket 13, within a range of the slots 14c.

Figure 6B:
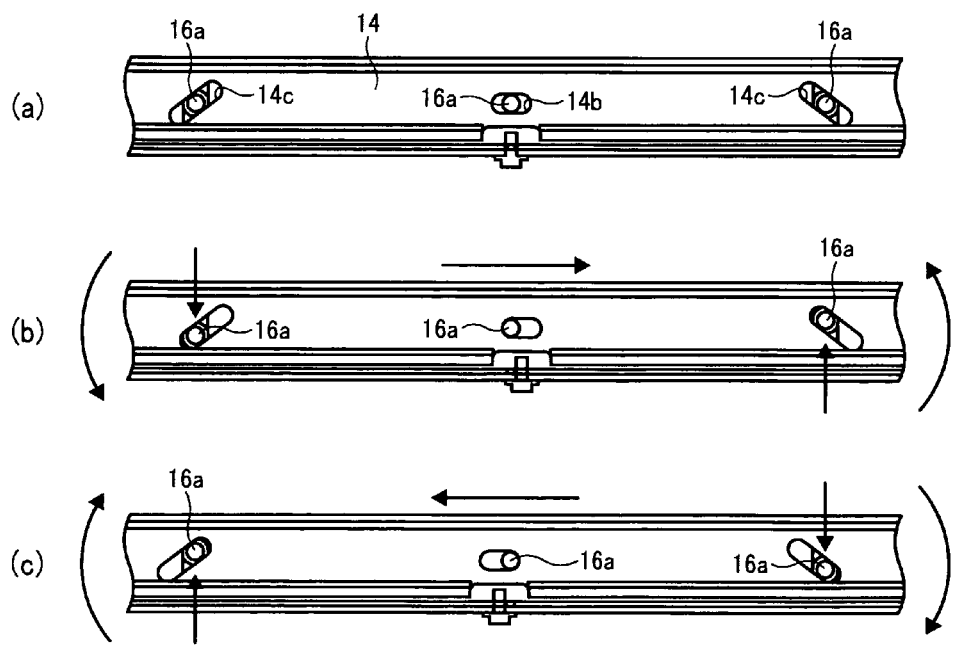
FIGS. 6B(a) to 6B(c) are views respectively illustrating operations of the correction roller.

FIGS. 6B(a) to 6B(c) are views respectively illustrating operations of the correction roller 12. Specifically, FIG. 6B(a) is a view illustrating a state in which the correction roller 12 is not rotated, and the three shafts 16a are positioned at the center of the reference slot 14b and the slots 14c, respectively.

When shifting or meandering of the fixing belt 50 occurs in the fixing device 5, the external force caused by shifting or meandering of the fixing belt 50 acts on the detection roller 11 so that the conversion member 14 slides on the guide rail of the reference bracket 13 to displace the position thereof in the direction of the rotary shaft 11c of the detection roller 11. At this time, the position of the conversion member 14 is displaced either to the right as illustrated in FIG. 6B(b) or to the left as illustrated in FIG. 6B(c).

When the conversion member 14 is moved to the right as illustrated in FIG. 6B(b), the slots 14c are also moved to the right. Accordingly, a force acts on the left shaft 16a to move the left shaft 16a downward along the slot 14c, and a force acts on the right shaft 16a to move the right shaft 16a upward along the slot 14c. At this time, because the central shaft 16a is rotatably supported at the reference hole 13b of the reference bracket 13 fixed to the fixing device 5, the correction roller 12 and the correction bracket 16 are rotated around the central shaft 16a in the counterclockwise direction in FIG. 6B(b).

When the conversion member 14 is moved to the left as illustrated in FIG. 6B(c), the slots 14c are also moved to the left. Accordingly, a force acts on the left shaft 16a to move the left shaft 16a upward along the slot 14c, and a force acts on the right shaft 16a to move the right shaft 16a downward along the slot 14c. Accordingly, the correction roller 12 and the correction bracket 16 are rotated around the central shaft 16a in the clockwise direction in FIG. 6B(c).

When shifting of the fixing belt 50 occurs, the detection roller 11 is moved to one direction in the direction of the rotary shaft 11c of the detection roller 11, so that the correction roller 12 is rotated in a predetermined direction. By contrast, when meandering of the fixing belt 50 occurs, the detection roller 11 is moved to both directions in the direction of the rotary shaft 11c of the detection roller 11, so that the correction roller 12 is rotated in both directions, or swings.

The correction bracket 16, the shafts 16a, the reference bracket 13 including the reference holes 13b and the slots 13c, and the conversion member 14 including the reference slot 14b and the slots 14c may be formed of metal such as iron. Accordingly, durability of the components in the mechanism for converting displacement of the detection roller 11 into angular displacement of the correction roller 12 can be improved compared with the configuration of the related art described previously.

Figure 7A:
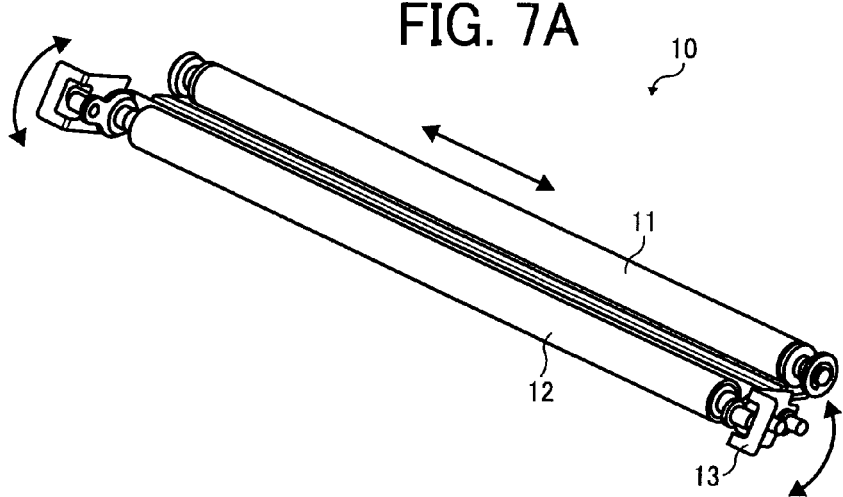
FIGS. 7A to 7C are perspective views respectively illustrating operations of the driven roller unit.
Figure 7B:
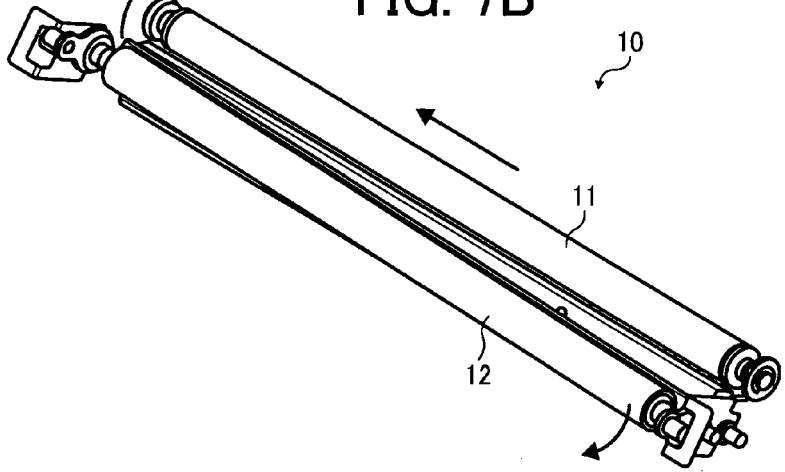
Figure 7C:
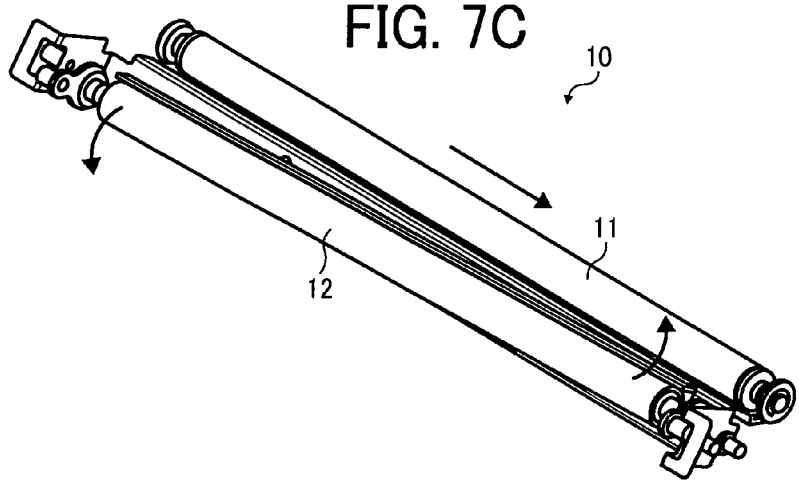

FIGS. 7A to 7C are perspective views respectively illustrating operations of the driven roller unit 10.

When shifting or meandering of the fixing belt 50 does not occur, the position of the detection roller 11 is not changed, and the correction roller 12 is not rotated as illustrated in FIG. 7A.

However, when shifting of the fixing belt 50 occurs in one direction in the width direction of the fixing belt 50, for example, the detection roller 11 is moved to the upper left direction as illustrated in FIG. 7B, so that the correction roller 12 is rotated in the clockwise direction in FIG. 7B. As a result, the correction roller 12 operates to move the fixing belt 50 to a direction opposite the one direction (hereinafter referred to as the other direction) in the width direction of the fixing belt 50, thereby correcting shifting of the fixing belt 50.

By contrast, when shifting of the fixing belt 50 occurs in the other direction in the width direction of the fixing belt 50, for example, the detection roller 11 is moved to the lower right direction as illustrated in FIG. 7C, so that the correction roller 12 is rotated in the counterclockwise direction in FIG. 7C. As a result, the correction roller 12 operates to move the fixing belt 50 to the one direction in the width direction of the fixing belt 50, thereby correcting shifting of the fixing belt 50.

FIGS. 8A, 8B, 9A, and 9B are views respectively illustrating how to correct shifting or meandering of the fixing belt 50 in the fixing device 5.

Figure 8A:
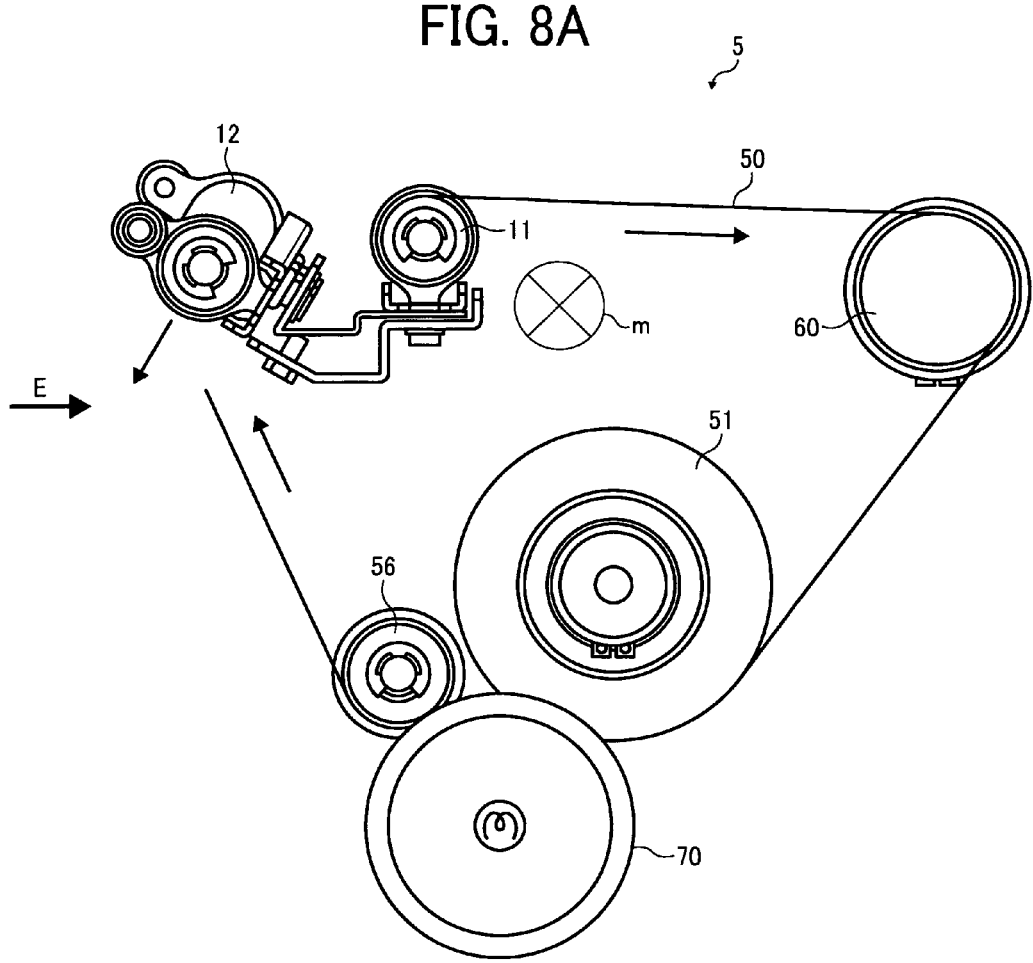
FIGS. 8A and 8B are views respectively illustrating an example of how to correct shifting or meandering of the fixing belt in the fixing device illustrated in FIG. 1.
Figure 8B:
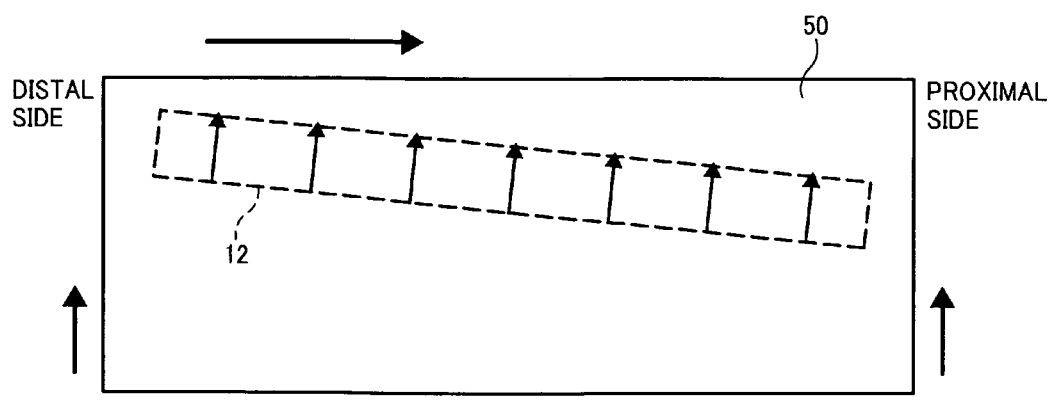

Specifically, FIG. 8A is a vertical cross-sectional view illustrating a state in which shifting of the fixing belt 50 from a proximal side to a distal side on a plane of paper in FIG. 8A occurs. At this time, as described above in FIGS. 4 and 5, the detection roller 11 slides to a direction indicated by a mark m. In other words, the detection roller 11 is moved from the proximal side to the distal side on the plane of paper in FIG. 8A. Accordingly, as described above in FIG. 6, the above-described displacement of the detection roller 11 is converted into the angular displacement of the correction roller 12 in the direction of rotation thereof, and as illustrated in FIG. 8B which shows the fixing belt 50 viewed from a side indicated by an arrow E in FIG. 8A, the correction roller 12 is rotated such that an end thereof in a direction of shifting of the fixing belt 50, that is, a left end of the correction roller 12 in FIG. 8B, is positioned at a downstream side relative to the direction of rotation of the fixing belt 50, and the other end of the correction roller 12, that is, a right end of the correction roller 12 in FIG. 8B, is positioned at a upstream side relative to the direction of rotation of the fixing belt 50. A force in a direction opposite the direction of shifting of the fixing belt 50, that is, the right direction in FIG. 8B, acts on the fixing belt 50 due to friction occurs between the fixing belt 50 and the correction roller 12 rotated as described above, thereby correcting shifting of the fixing belt 50.

Figure 9A:
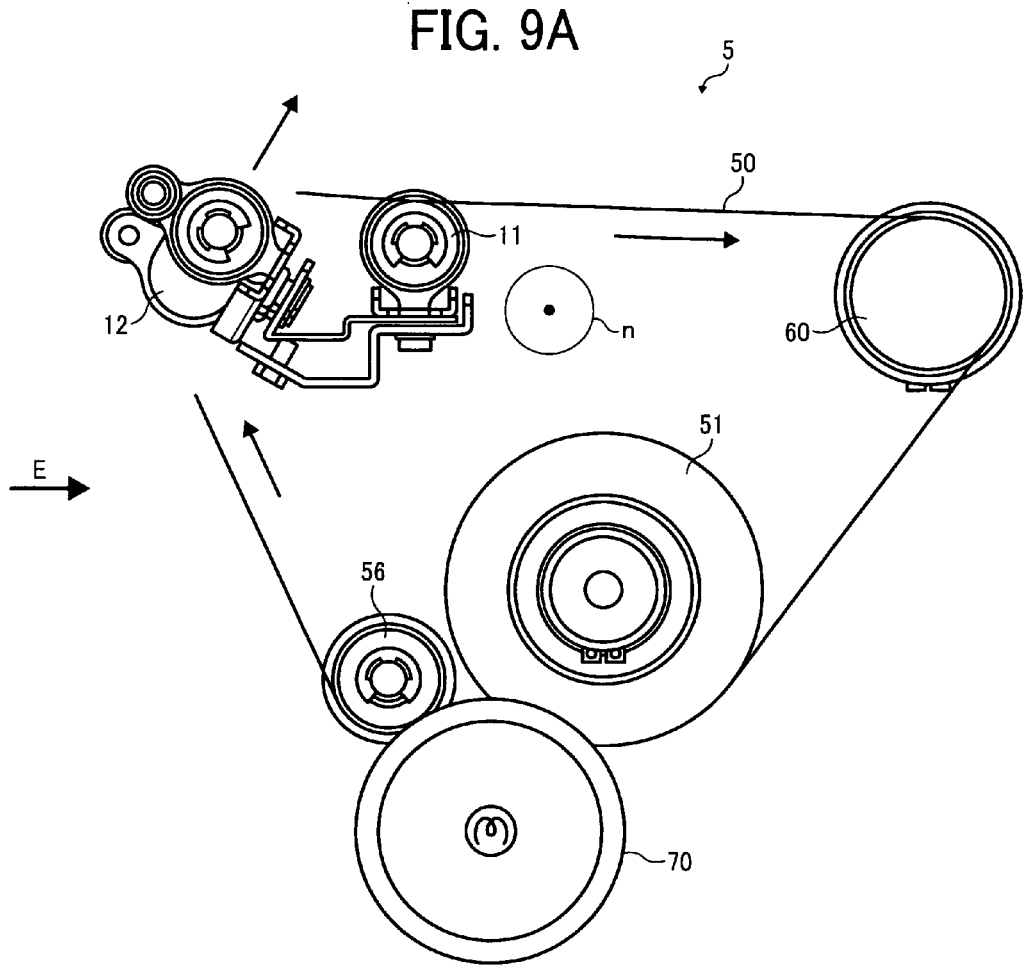
FIGS. 9A and 9B are views respectively illustrating another example of how to correct shifting or meandering of the fixing belt in the fixing device illustrated in FIG. 1.
Figure 9B:
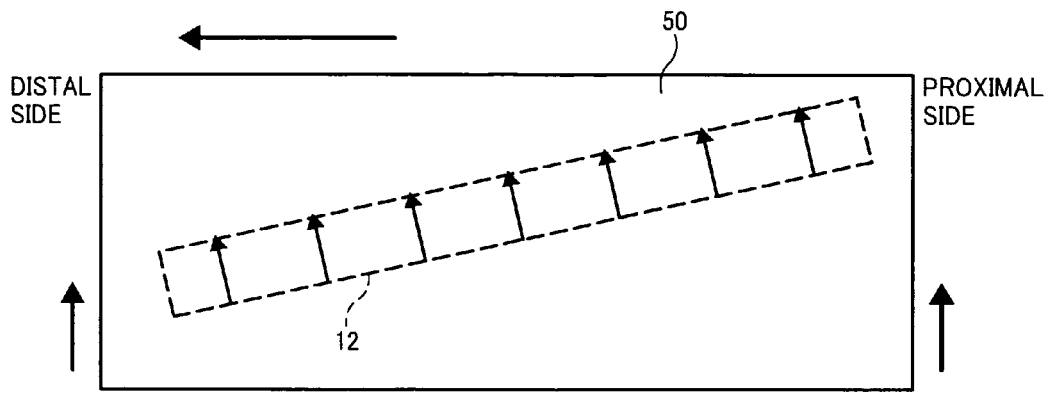
Figure 10:
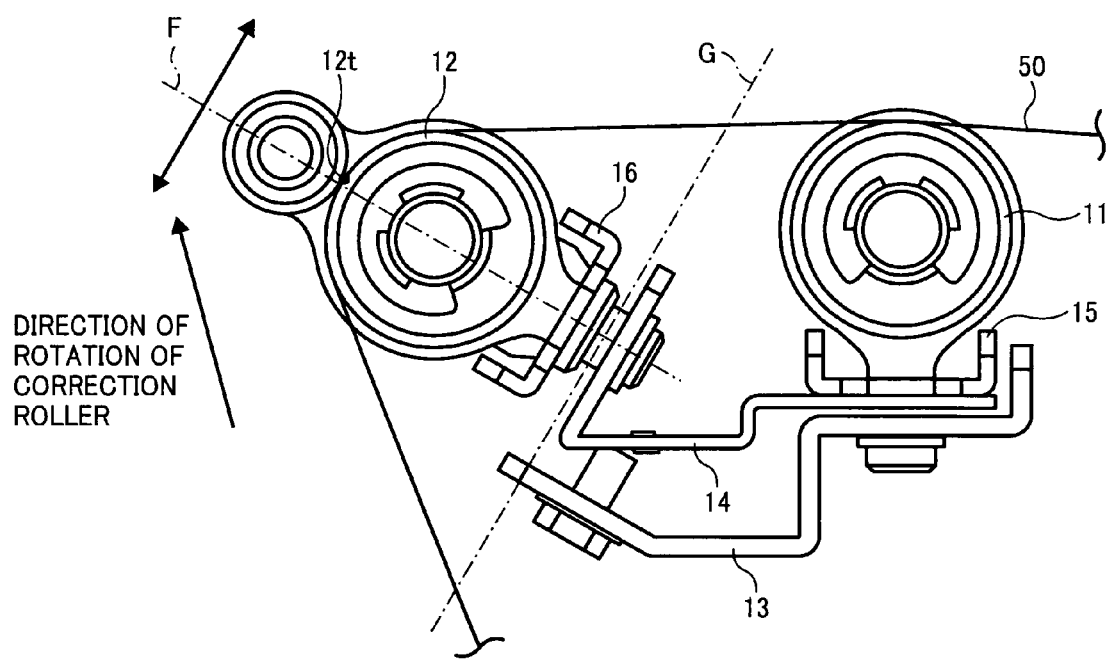
FIG. 10 is a vertical cross-sectional view illustrating how the correction roller contacts the fixing belt.

FIG. 9A is a vertical cross-sectional view illustrating a state in which shifting of the fixing belt 50 from a distal side to a proximal side on a plane of paper in FIG. 9A occurs. At this time, as described above in FIGS. 4 and 5, the detection roller 11 slides to a direction indicated by a mark n in FIG. 9A. In other words, the detection roller 11 is moved from the distal side to the proximal side on the plane of paper in FIG. 9A. Accordingly, as described above in FIG. 6, the above-described displacement of the detection roller 11 is converted into angular displacement of the correction roller 12 in the direction of rotation thereof, and as illustrated in FIG. 9B that shows the fixing belt 50 viewed from a side indicated by the arrow E in FIG. 9A, the correction roller 12 is rotated such that an end thereof in a direction of shifting of the fixing belt 50, that is, the right end of the correction roller 12 in FIG. 9B, is positioned at a downstream side relative to the direction of rotation of the fixing belt 50, and the other end of the correction roller 12, that is, the left end of the correction roller 12 in FIG. 9B, is positioned at an upstream side relative to the direction of rotation of the fixing belt 50. A force in a direction opposite the direction of shifting of the fixing belt 50, that is, the left direction in FIG. 9B, acts on the fixing belt 50 due to friction occurs between the fixing belt 50 and the correction roller 12 rotated as described above, thereby correcting shifting of the fixing belt 50.

The above-described operations of the driven roller unit 10 can reliably prevent shifting and meandering of the fixing belt 50. In addition, angular displacement of the correction roller 12 in the direction of rotation thereof is performed proportionally to displacement of the detection roller 11, that is, a degree of shifting of the fixing belt 50, thereby appropriately correcting shifting or meandering of the fixing belt 50. Further, because neither sensors nor additional driving members such as motors are necessary for detecting and correcting shifting and meandering of the fixing belt 50, the configuration of the fixing device 5 according to illustrative embodiments can be simplified, resulting in cost reduction.

It is preferable that the correction roller 12 be designed to rotate on a virtual plane G substantially perpendicular to a virtual plane F passing through the center of rotation of the correction roller 12 and a summit 12t of the correction roller 12 where the correction roller 12 contacts the fixing belt 50 wound around the correction roller 12. Rotation of the correction roller 12 on the virtual plane G is the most sensitive to shifting of the fixing belt 50 contacting the summit 12t of the correction roller 12. In other words, rotation of the correction roller 12 on the virtual plane G can most effectively correct shifting or meandering of the fixing belt 50. Accordingly, the above-described configuration can reliably prevent shifting and meandering of the fixing belt 50.

An outer circumferential surface of a cylindrical main body of the correction roller 12 is preferably coated with an elastic material such as silicone rubber. As a result, a frictional factor between the inner surface of the fixing belt 50 and the correction roller 12 rotatively driven on the inner surface of the fixing belt 50 is increased, thereby reliably preventing shifting or meandering of the fixing belt 50 by rotation of the correction roller 12.

It is preferable that the driven rollers of the driven roller unit 10, that is, the detection roller 11 and the correction roller 12, be used as a tension roller to provide tension to the fixing belt 50. In addition to causing the fixing belt 50 to be pressed against the pressure roller 70 with the fixing roller 51 and the separation roller 56 to rotate the fixing belt 50, drag from the fixing belt 50 on the detection roller 11 and the correction roller 12 is increased. Accordingly, a frictional force with the fixing belt 50 determined by multiplying the frictional factor by the drag can be increased in both the detection roller 11 and the correction roller 12. As a result, the detection roller 11 can easily detect shifting and meandering of the fixing belt 50, thereby more effectively preventing shifting and meandering of the fixing belt 50 by rotation of the correction roller 12 described above.

Figure 11:
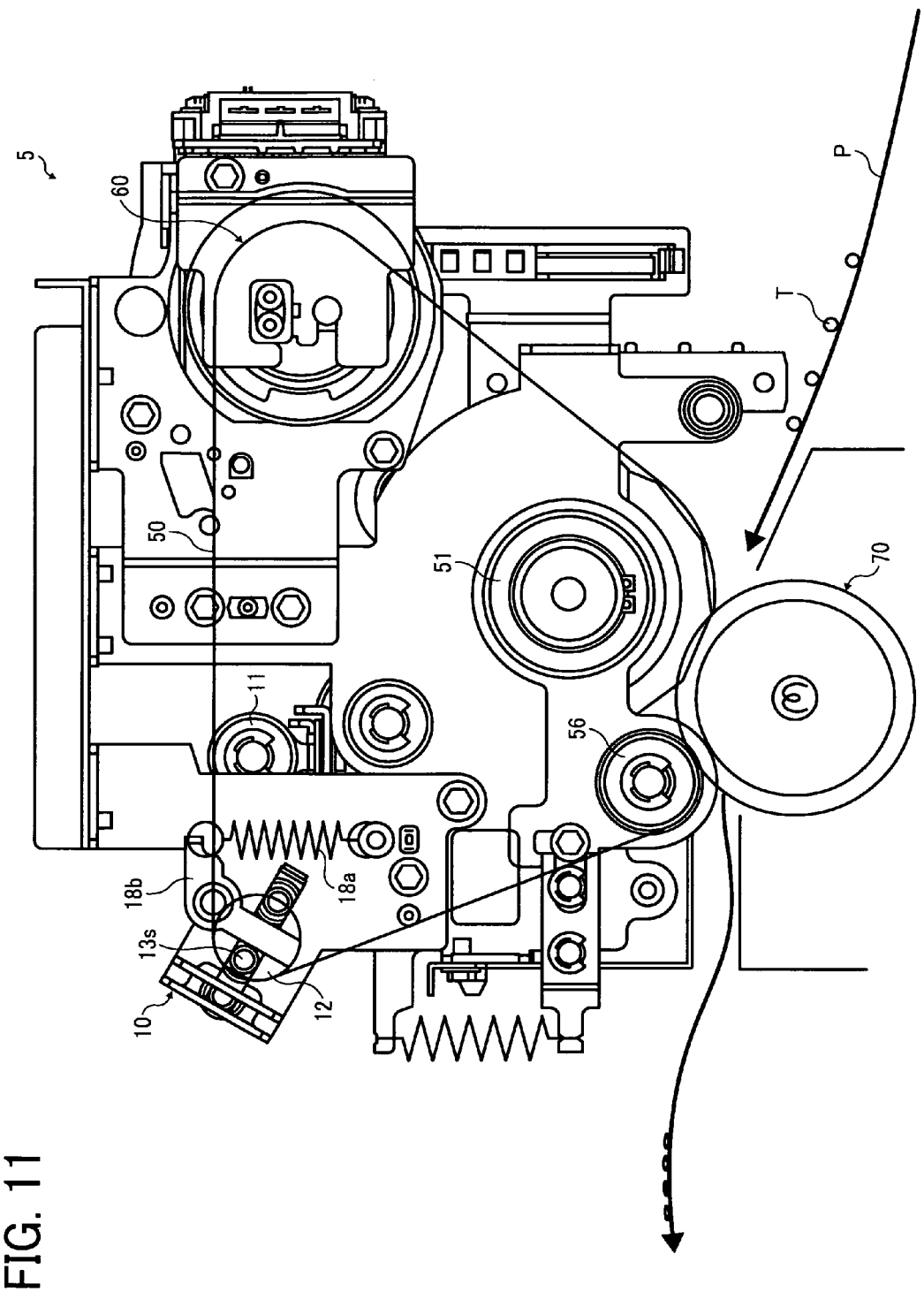
FIG. 11 is a vertical cross-sectional view illustrating how the driven roller unit applies a tension to the fixing belt.

FIG. 11 is a vertical cross-sectional view illustrating how the driven roller unit 10 applies tension to the fixing belt 50. Here, the driven roller unit 10 includes a spring 18a provided to the housing of the fixing device 5 and a cam 18b, an end of which is connected to the spring 18a. The other end of the cam 18b pushes upward the support pin 13s of the reference bracket 13 in the driven roller unit 10 due to elasticity of the spring 18a, so that the detection roller 11 and the correction roller 12 are pressed against the inner surface of the fixing belt 50 with a predetermined amount of pressure.

The driven roller unit 10 serving as a correction mechanism for correcting shifting and meandering of the fixing belt 50 according to illustrative embodiments may be applicable to a variety of fixing devices employing a belt fixing method. In a case of the fixing device 5 illustrated in FIG. 1, the fixing nip N1 includes the two nips respectively formed between the pressure roller 70 and the fixing roller 51 and between the pressure roller 70 and the separation roller 56 with the fixing belt 50 therebetween, and the fixing roller 51 includes a thick elastic layer formed of silicone foam rubber. Accordingly, the pressure roller 70 digs relatively deeply into the fixing roller 51, so that shifting or meandering of the fixing belt 50 may more easily occur compared with the fixing devices of the related art. Therefore, the driven roller unit 10 according to illustrative embodiments is particularly effective in the fixing device 5 illustrated in FIG. 1.

Figure 12:
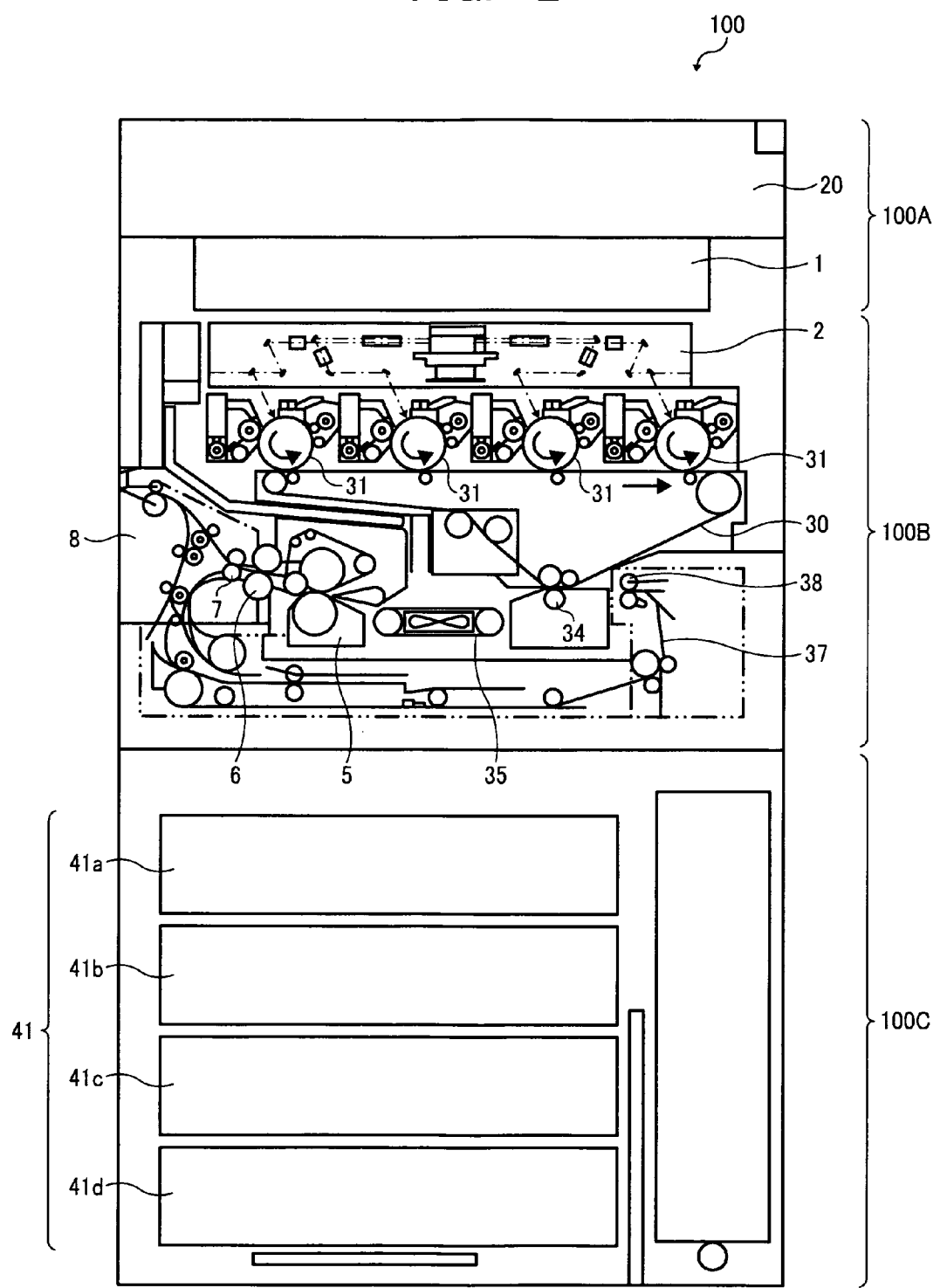
FIG. 12 is a vertical cross-sectional view illustrating a configuration of an image forming apparatus according to illustrative embodiments.

A description is now given of a configuration of an image forming apparatus according to illustrative embodiments. FIG. 12 is a vertical cross-sectional view illustrating an example of an overall configuration of a digital full-color copier serving as an image forming apparatus 100 according to illustrative embodiments.

The image forming apparatus 100 includes an image reading unit 100A provided at the top of the image forming apparatus 100, an image forming unit 100B provided at the center of the image forming apparatus 100, and a sheet feeder 100C provided at the bottom of the image forming apparatus 100.

The image reading unit 100A includes a scanner 1 to optically read image data of documents, and an automatic document feeder (ADF) 20 to continuously convey the documents to the scanner 1.

The image forming unit 100B includes an intermediate transfer belt 30 having a transfer surface extending in a horizontal direction. A configuration for forming images of those colors in a relation of separated colors and complementary colors is provided above the intermediate transfer belt 30. Specifically, four photoconductors 31 each serving as an image carrier capable of carrying an image of a specific color of yellow, magenta, cyan, or black, are arranged along the transfer surface of the intermediate transfer belt 30.

A writing unit 2 to direct a light beam based on the image data scanned by the scanner 1 or external image data onto a surface of each of the four photoconductors 31 is provided above the photoconductors 31. Each of the photoconductors 31 includes a drum rotatable in the same direction, that is, a counterclockwise direction in FIG. 12. A charger, a developing device, and a primary transfer device each performing image forming processes as the photoconductors 31 are rotated, and a cleaning device to collect residual toner adhering to the surfaces of the photoconductors 31 after primary transfer are provided around each of the photoconductors 31. It is to be noted that the developing device includes toner of a specific color of yellow, magenta, cyan, or black.

The intermediate transfer belt 30 is stretched among a driving roller and driven rollers, and is rotatable in a direction same as the direction of rotation of the photoconductors 31 at positions contacting the photoconductors 31. The image forming unit 100B further includes a secondary transfer device 34 serving as a transfer roller at a position opposite one of the driven rollers. Further, a conveyance belt 35, the fixing device 5 described above, a gloss imparting device 6, and a pair of conveyance rollers 7 are provided, in that order, from the secondary transfer device 34 along a conveyance path of the sheet.

The sheet feeder 100C includes sheet feed trays 41a, 41b, 41c, and 41d (hereinafter collectively referred to as sheet feed trays 41) each storing a recording medium such as a sheet. A stack of sheets stored in the sheet feed trays 41 is separated one by one and is conveyed through a conveyance path 37 to a registration unit 38 each included in a conveyance mechanism. The registration unit 38 corrects a skew of the sheet and determines a time to convey the sheet to a secondary transfer position based on the image forming processes.

In the image forming apparatus 100, a surface of the photoconductor 31 is evenly charged by the charger, and the writing unit 2 directs a light beam onto the charged surface of the photoconductor 31 based on the image data scanned by the scanner 1 or external image data to form an electrostatic latent image of the corresponding color on the surface of the photoconductor 31. The electrostatic latent image thus formed on the surface of the photoconductor 31 is developed by the developing device storing toner of the corresponding color so that a toner image of the corresponding color is formed on the surface of the photoconductor 31. The toner image thus formed is then primarily transferred onto the intermediate transfer belt 30 by the primary transfer device to which a predetermined amount of bias is applied. Toner images of yellow, magenta, cyan, and black are formed in the same manner as described above and are sequentially transferred onto the intermediate transfer belt 30 in a superimposed manner by an electrostatic force. Accordingly, a full-color toner image is formed on the intermediate transfer belt 30.

The full-color toner image thus formed on the intermediate transfer belt 30 is then transferred by the secondary transfer device 34 onto the sheet conveyed from the sheet feed trays 41. The sheet having the transferred full-color toner image thereon is conveyed to the fixing device 5, and the full-color toner image is fixed to the sheet at the fixing nip formed between a fixing member such as the fixing belt 50 and a pressing member such as the pressure roller 70. Subsequently, glossiness is imparted to the fixed toner image on the sheet by the gloss imparting device 6 as needed. Thereafter, the sheet having the full-color image thereon is conveyed by the pair of the conveyance rollers 7 to a discharge unit 8, and is further conveyed from the discharge unit 8 along a discharge path to be discharged from the image forming apparatus 100. As a result, a sequence of the image forming processes is completed.

Because the fixing device 5 is employed in the image forming apparatus 100 according to illustrative embodiments, breakdown of the fixing device 5 and image shift due to occurrences of shifting and meandering of the fixing belt 50 can be prevented, thereby providing higher reliability. It is to be noted that the image forming apparatus 100 illustrated in FIG. 12 can provide higher fixing performance and improved glossiness imparting performance, and can handle, without decreasing productivity, a variety of types of sheets including thin paper and heavy paper and a variety of types of images with or without glossiness.

Figure 13:
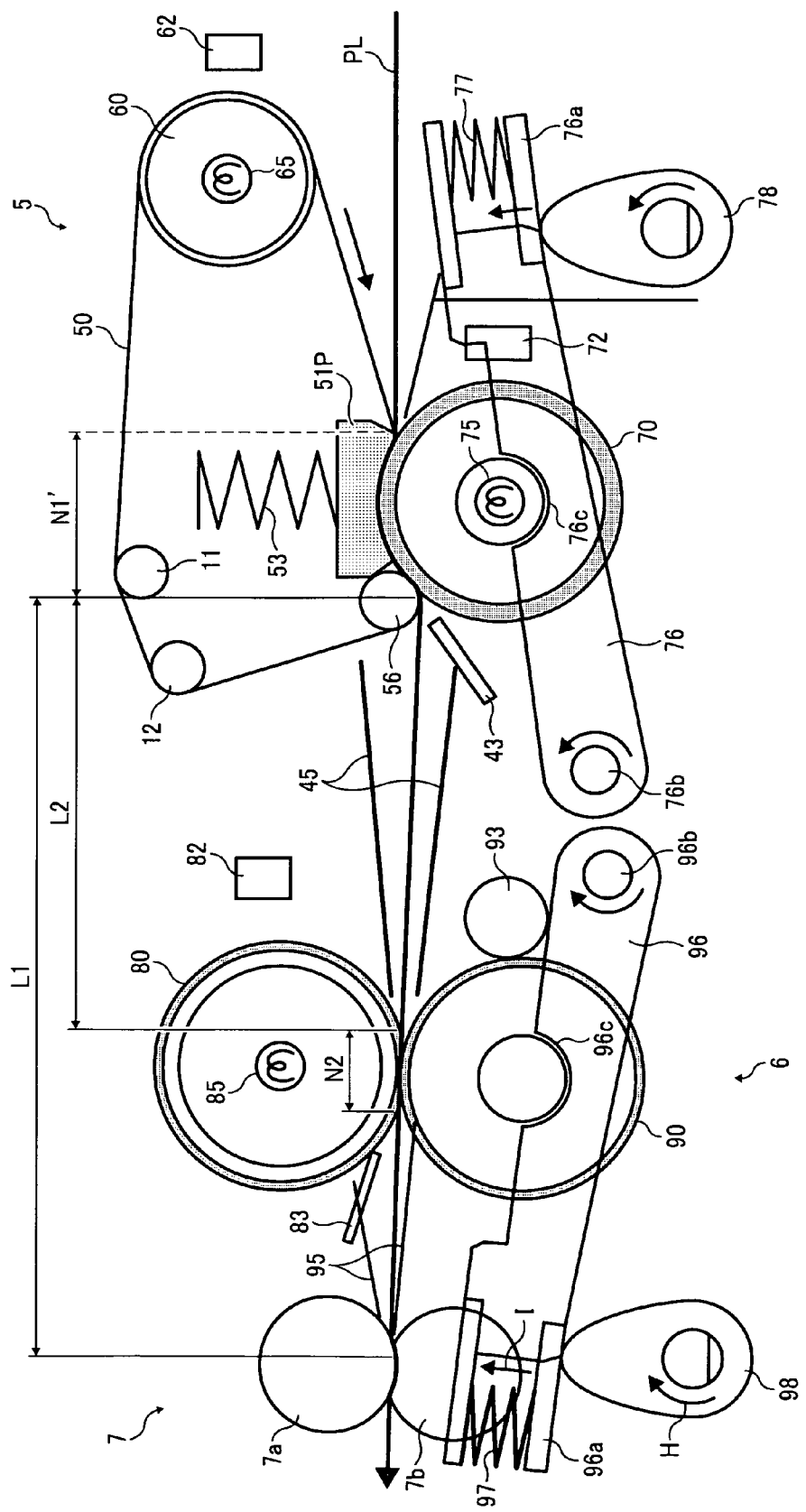
FIG. 13 is a schematic view illustrating a configuration of main components of the image forming apparatus illustrated in FIG. 12.

FIG. 13 is a schematic view illustrating a configuration of main components of the image forming apparatus 100 illustrated in FIG. 12.

The image forming apparatus 100 has two modes, that is, a mode for imparting glossiness to toner images formed on the sheets (hereinafter referred to as a gloss mode) and a mode for not imparting glossiness to the toner images formed on the sheets (hereinafter referred to as a non-gloss mode). The image forming apparatus 100 includes the fixing device 5 including a rotatable fixing member such as the fixing belt 50 and a pressing member such as the pressure roller 70 pressed against the fixing member to form a fixing nip N1' for fixing the toner image onto the sheet; the gloss imparting device 6 including a first rotatable body such as a heating roller 80 having heating means such as a heating member 85 therein, and a second rotatable body such as a pressing roller 90 pressed against the first rotatable body to form a nip N2 for imparting glossiness to the fixed toner image on the sheet; and the pair of the conveyance rollers 7 to convey the sheets, positioned within a distance L1, that is, a distance within 210 mm from an exit of the fixing nip N1'. The fixing device 5, the gloss imparting device 6, and the pair of the conveyance rollers 7 are provided in that order on a path PL relative to the direction of conveyance of the sheets.

In a case in which the non-gloss mode is selected and a sheet having a length shorter than 210 mm is used, the gloss imparting device 6 causes a pressure at the nip N2 between the heating roller 80 and the pressing roller 90 to be lower than that in a case of the gloss mode to convey the sheet. By contrast, in a case in which a sheet having a length equal to or longer than 210 mm is used, the gloss imparting device 6 provides a space between the heating roller 80 and the pressing roller 90 so that the pair of the conveyance rollers 7 conveys the sheet.

The fixing device 5 illustrated in FIG. 13 has a configuration same as that of the fixing device 5 illustrated in FIG. 1, except that the fixing roller 51 illustrated in FIG. 1 is changed to a fixing pad 51P and a pressing member 53. Specifically, the fixing device 5 illustrated in FIG. 13 includes the fixing pad 51P serving as a pressing member; the separation roller 56; the fixing belt 50 wound around the heat roller 60 and the driven rollers of the driven roller unit 10, that is, the detection roller 11 and the correction roller 12, with a predetermined amount of tension; the pressure roller 70 rotatably pressed against the fixing belt 50 to form the fixing nip N1'; and the separation member 43, a leading edge of which is positioned closer to the pressure roller 70 at the exit of the fixing nip N1' to separate the sheet from the pressure roller 70.

The fixing pad 51P has an elastic body, and is pressed against the fixing belt 50 from the inner surface of the fixing belt 50 by the pressing member 53 with a predetermined amount of pressure, so that the fixing pad 51P is pressed against the pressure roller 70 with the fixing belt 50 therebetween. The separation roller 56 is also pressed against the pressure roller 70 with the fixing belt 50 therebetween. Accordingly, the fixing nip N1' having a predetermined amount of width to apply heat and pressure to the sheet is formed.

In the fixing device 5, the surface of the fixing belt 50 is heated to a predetermined temperature while the fixing belt 50 and the pressure roller 70 are rotatively driven. The sheet having an unfixed toner image thereon is conveyed through the fixing nip N1' from right to left in FIG. 13 so that the unfixed toner image is melted and fixed onto the sheet by heat and pressure applied to the sheet at the fixing nip N1'.

Subsequently, the sheet having a fixed toner image thereon is discharged from the fixing nip N1' by being separated from the pressure roller 70 using the separation member 43.

In the fixing device 5 with the above-described configuration illustrated in FIG. 13, shifting and meandering of the fixing belt 50 can be reliably corrected by the driven roller unit 10 described above, thereby achieving appropriate rotation of the fixing belt 50.

A total period of time in which the sheet is pressed between the fixing pad 51P and the pressure roller 70 and between the separation roller 56 and the pressure roller 70 at the fixing nip N1' in the fixing device 5 relative to the linear velocity of the fixing device 5 is 60 m/sec or more, and a half or more of all the width of the fixing nip N1' has a pressure in a range between 15 N/cm$^2$ and 30 N/cm$^2$. Accordingly, the toner image formed on the sheet including heavy paper having a weight of about 300 g/m$^2$ can be completely fixed to the sheet by the fixing device 5.

In consideration of the influence of glossiness imparted to the toner image by the fixing device 5, it is preferable that the fixing pad 51P include a silicone sponge. Conventionally, a fixing pad including solid rubber has been used in the fixing device when the amount of pressure at the fixing nip is set to 15 N/cm$^2$ or more because the silicone sponge is degraded by such a large amount of pressure. However, because the fixing device 5 is designed such that the amount of pressure at the fixing nip N1' is reduced during a standby mode, and the silicone sponge having higher hardness, for example, a hardness (ASKER-C) of 25 degrees or greater, is included in the fixing pad 51P according to illustrative embodiments, deterioration of the silicone sponge can be prevented, thereby providing durability of the fixing pad 51P including the silicone sponge.

When the amount of pressure at the fixing nip N1' is set to 15 N/cm$^2$ or less in the fixing device 5 having the above-described configuration, the degree of glossiness of the toner image does not reach 30%, so that glossiness is not imparted to the toner image by the fixing device 5. In a case in which the degree of glossiness of the toner image is varied in the gloss mode depending on a thickness of the sheet, or the degree of glossiness of the toner image formed on a thin sheet is increased in the non-gloss mode, the cam 78 serving as the pressing means is adjusted so that a percentage of a portion in all the width of the fixing nip N1' having the amount of pressure in a range between 15 N/cm$^2$ and 30 N/cm$^2$ is adjusted with the fixing pad 51P including the silicone sponge, thereby controlling the degree of glossiness imparted to the toner image. Here, the degree of glossiness (%) is measured by a 60° glossmeter.

Figure 14:
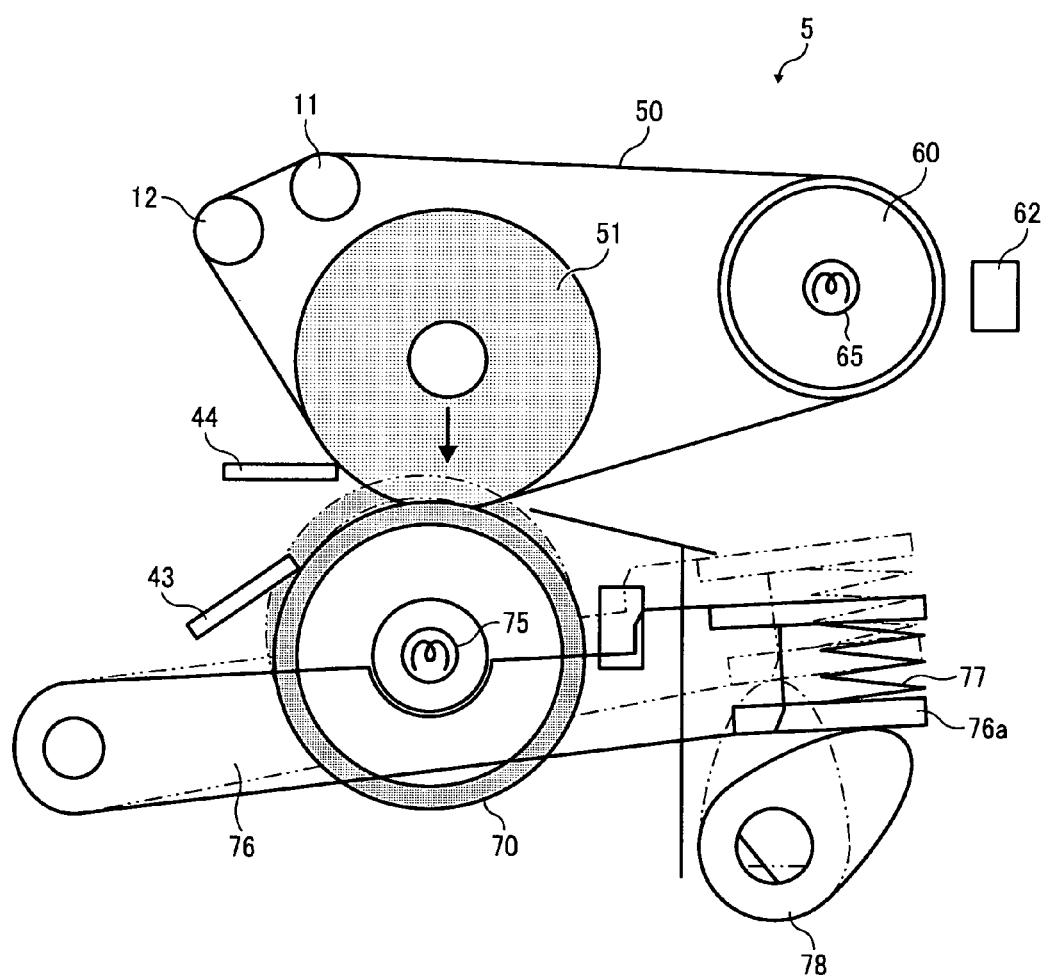
FIG. 14 is a vertical cross-sectional view illustrating another example of a configuration of the fixing device according to illustrative embodiments.

Not only the fixing device 5 illustrated in FIG. 13 but also the fixing device 5 illustrated in FIG. 1 may be applicable to the image forming apparatus 100 according to illustrative embodiments. Alternatively, the fixing device 5 illustrated in FIG. 14 in which the separation roller 56 is omitted from the configuration illustrated in FIG. 1 may be applicable to the image forming apparatus 100 according to illustrative embodiments. Accordingly, in the fixing device 5 illustrated in FIG. 14, only the pressure roller 70 is pressed against the fixing roller 51 with the fixing belt 50 therebetween to form a fixing nip. It is preferable that a separation member 44 be provided on the fixing belt 50 at an exit of the fixing nip. In the fixing device 5 illustrated in FIG. 14, the cam 78 serving as a pressing means is rotatable, and a state in which the amount of pressure at the fixing nip is maximized is indicated by broken lines in FIG. 14, and a state in which the amount of pressure at the fixing nip is minimized is indicated by solid lines.

The sheet discharged from the fixing device 5 is then conveyed to the gloss imparting device 6. As illustrated in FIG. 13, for example, it is preferable that a pair of guide plates 45 in which two plate members are arranged above and below the path PL, respectively, be provided between the fixing device 5 and the gloss imparting device 6 so that a space for conveying the sheet is narrowed down from the fixing device 5 to the gloss imparting device 6. Although the sheet separated from the pressure roller 70 by a curvature of the separation roller 56 tends to be curled up, the pair of the guide plates 45 corrects the curl-ups of the sheet so that the leading edge of the sheet faces the direction of conveyance of the sheet. As a result, occurrence of wrinkles on the sheet and paper jam in the gloss imparting device 6 can be prevented, thereby reliably conveying the sheet. It is to be noted that the toner image is sufficiently fixed onto the sheet by the fixing device 5 according to illustrative embodiments so that higher image quality can be provided even if the sheet contacts the pair of the guide plates 45.

The gloss imparting device 6 includes the heating roller 80 serving as the first rotatable body having the heating member 85 therein, and the pressing roller 90 serving as the second rotatable body pressed against the first rotatable body to form the nip N2 for imparting glossiness to the fixed toner image on the sheet.

The gloss imparting device 6 further includes a temperature detector 82 for detecting a temperature on a surface of the heating roller 80 at a portion closer to an entrance of the nip N2. The heating member 85 such as a halogen heater is turned on and off based on the temperature detected by the temperature detector 82 to keep the temperature on the surface of the heating roller 80 constant.

The temperature on the surface of the heating roller 80 is controlled to appropriately impart glossiness to the fixed toner image on the sheet when the gloss mode is selected. For example, the temperature on the surface of the heating roller 80 to contact the fixed toner image on the sheet is lower than the temperature on the surface of the fixing belt 50 of the fixing device 5. Alternatively, it is preferable that the temperature on the surface of the heating roller 80 be in a range between a temperature of the sheet entering into the gloss imparting device 6 and a temperature of the sheet immediately after discharging from the fixing device 5.

Further alternatively, it is preferable that the temperature on the surface of the heating roller 80 be in a range between a softening temperature of the toner and a ½ flow starting temperature of the toner, each measured using a flow tester, for example, CFT-500D manufactured by Shimadzu Corporation, under a condition of a load of 5 kg/cm$^2$ and an increasing temperature of 3.0 C.°/min using a nozzle with a diameter of 1.00 mm and a length of 10.0 mm. It is to be noted that the ½ flow starting temperature is a medium temperature between a flow start temperature and a flow ending temperature of the toner.

Specifically, the temperature on the surface of the heating roller 80 is preferably in a range between 60 C.° and 137 C.°, more preferably in a range between 60 C.° and 120 C.°, and most preferably in a range between 80 C.° and 100 C.°. It is to be noted that a temperature of the toner varies depending on a color of the toner, a toner lot, and so forth, and the temperature of the toner here indicates an average temperature.

While the sheet is passing through the fixing device 5, heat and pressure are applied to the sheet at the fixing nip N1' so that all the toner layer of the unfixed toner image on the sheet is melted to be fixed to the sheet. The toner tends to adhere to the sheet when a certain degree of leveling is performed so that a surface of the toner image has a large viscosity.

By contrast, only an amount of heat necessary for leveling the surface of the toner image is applied while the sheet is passing through the gloss imparting device 6 because the toner image is already fixed to the sheet by the fixing device 5. Although heat and pressure are applied at the nip N2 to the toner image on the sheet passing through the gloss imparting device 6, all the toner layer of the toner image is not melted but only a surface layer of the toner image is soften because the temperature on the surface of the heating roller 80 is set in a range between the temperature of the sheet entering into the gloss imparting device 6 and the temperature of the sheet immediately after discharging from the fixing device 5. As a result, only the surface layer of the toner image is leveled by a flat surface of the heating roller 80 while a color of the toner image is kept as it is, thereby increasing glossiness of the toner image. At this time, because the viscosity of the surface of the toner image is not as strong as that during the fixing process, the sheet is reliably separated from the heating roller 80 having a diameter in a range between 30 mm and 40 mm. In other words, a separation member 83 provided at the exit of the nip N2 may be omitted, thereby achieving simplification of the configuration of the gloss imparting device 6 and cost reduction. Further, because the offset caused by a process of melting the all the toner layer of the toner image performed during the fixing process can be prevented, a cleaning member 93 that removes residual toner from the surface of the pressing roller 90 may be omitted, thereby achieving further simplification of the configuration of the gloss imparting device 6 and cost reduction.

The pressing roller 90 is a cylindrical roller having a metal core formed of aluminum, iron, or the like, and an elastic layer formed of silicone rubber or the like provided on the metal core. The pressing roller 90 is provided with pressure adjustment means including a pressure lever 96, a spring 97, a pressure member 96a, and a cam 98. During the gloss mode, the pressing roller 90 is pressed against the heating roller 80 by the pressure adjustment means.

When the cam 98 is rotated at a certain angle in a direction indicated by an arrow H in FIG. 13 by an external driving force, the pressing member 96a is pushed upward as indicated by an arrow I in FIG. 13 by the cam 98. When the pressing member 96a is pushed upward, the spring 97 fixed to the pressing member 96a pushes an end of the pressure lever 96 upward with a certain amount of pressure, and the pressure lever 96 is rotated around a support shaft 96b in a clockwise direction in FIG. 13. Subsequently, a pressure portion 96c positioned between the end of the pressure lever 96 on the spring 97 side and the support shaft 96b contacts a shaft of the pressing roller 90 to press the pressing roller 90 against the heating roller 80. As a result, the pressing roller 90 contacts and presses the heating roller 80 with a certain amount of pressure to form the nip N2 for imparting glossiness to the toner image on the sheet. It is to be noted that the spring 97 may be omitted from the pressure adjustment means, and in such a case, the cam 98 is designed to directly push the end of the pressure lever 96.

A pressure applied to the pressing roller 90 by the pressure adjustment means is controlled by adjusting the rotation angle of the cam 98. The heating roller 80 and the pressing roller 90 are separated from each other at a certain rotation angle of the cam 98 to open the nip N2.

During the gloss mode, it is preferable that a pressure at the nip N2 be adjusted by the pressure adjustment means in a range between 15 N/cm$^2$ and 30 N/cm$^2$. Accordingly, when the sheet conveyed from the fixing device 5 passes through the gloss imparting device 6, a predetermined amount of pressure as well as heat are applied to the fixed toner image on the sheet at the nip N2 so that the surface layer of the fixed toner image is leveled and provided with glossiness.

When a sheet having a length shorter than 210 mm is used during the non-gloss mode, an amount of pressure at the nip N2 is set to be smaller than that set during the gloss mode by the pressure adjustment means. For example, in such a case, the amount of pressure at the nip N2 is set preferably to less than 15 N/cm$^2$, and more preferably to 5 N/cm$^2$ or less. Here, the pressure at the nip N2 means an average amount of the pressure in all the width of the nip N2. As a result, when the sheet passes between the heating roller 80 and the pressing roller 90, glossiness of the toner image on the sheet is not increased because of the smaller amount of pressure at the nip N2, and the heating roller 80 and the pressing roller 90 only convey the sheet.

When a sheet having a length equal to or longer than 210 mm is used during the non-gloss mode, it is preferable that the nip N2 formed between the heating roller 80 and the pressing roller 90 be opened by the pressure adjustment means.

During the non-gloss mode, a thin long sheet having a weight of 80 g/m² or less and a size of, for example, A3 size, may be used. In such a case, minute wrinkles or the like may appear on the sheet due to bending and tension caused by a slight difference in a linear velocity of the sheet between the fixing device 5 and the gloss imparting device 6. To solve such a problem, the heating roller 80 and the pressing roller 90 in the gloss imparting device 6 are separated from each other. At this time, although the sheet only passes through the gloss imparting device 6, a leading edge of the sheet discharging from the fixing nip N1' of the fixing device 5 reaches the pair of the conveyance rollers 7 because the length of the sheet is equal to or longer than 210 mm, so that the sheet is sandwiched and conveyed by the pair of the conveyance rollers 7. As a result, the toner image formed on the sheet is rarely touched by the heating roller 80 and the pressing roller 90 to provide higher image qualities while the sheet is reliably conveyed.

When the heating roller 80 and the pressing roller 90 are separated from each other, it is preferable that a gap between the heating roller 80 and the pressing roller 90 be equal to or less than 2 mm. If the gap between the heating roller 80 and the pressing roller 90 is greater than 2 mm, the sheet tends to be deviated from the path PL, causing paper jam.

It is preferable that the surface of each of the heating roller 80 and the pressing roller 90 be coated with a fluorine resin. As a result, when the heating roller 80 and the pressing roller 90 are separated from each other to provide the gap of 2 mm or less therebetween to cause the sheet to pass as described above during the non-gloss mode, although the surface of the toner image may partially contact the heating roller 80, scraping of the toner image can be prevented because a fluorine resin layer provided on the surface of the heating roller 80 has superior releasing performance.

The gloss imparting device 6 having the above-described configuration can reliably provide a target level of glossiness of the toner image in the gloss mode, and can improve reliability to provide the target level of glossiness of the toner image for both the gloss mode and the non-gloss mode.

With regard to positions of the heating roller 80 and the pressing roller 90 in the gloss imparting device 6, a distance L2 from the exit of the fixing nip N1' in the fixing device 5 to the entrance of the nip N2 in the gloss imparting device 6 is set preferably in a range between 60 mm and 182 mm, more preferably in a range between 70 mm and 150 mm, and most preferably in a range between 80 and 100 mm. If the distance L2 is less than 60 mm, a slope of the pair of the guide plates 45 becomes too steep because an interval between the two plate members of the pair of the guide plates 45 an entrance and exit thereof is fixed, possibly causing paper jam at the pair of the guide plates 45. It is preferable that the maximum length of the distance L2 be a length of a sheet having the minimum size. For example, in a case in which a sheet having a B5 size is conveyed in portrait orientation with a latitudinal direction thereof as a direction of conveyance of the sheet, the distance L2 is set to 182 mm. In a case in which a sheet having a half letter size is conveyed in portrait orientation with a latitudinal direction thereof as the direction of conveyance of the sheet, the maximum length of the distance L2 is set to 150 mm.

The sheet discharged from the gloss imparting device 6 is then conveyed to the pair of the conveyance rollers 7. For example, it is preferable that two guide plates 95 be provided above and below the path PL, respectively, between the gloss imparting device 6 and the pair of the conveyance rollers 7, and the guide plates 95 be provided such that a space to convey the sheet is narrowed down from the gloss imparting device 6 to the pair of the conveyance rollers 7. The guide plates 95 correct curl-ups and so forth of the sheet to guide the leading edge of the sheet to the direction of conveyance of the sheet so that wrinkles on the sheet and paper jam can be prevented, thereby reliably conveying the sheet.

The pair of the conveyance rollers 7 includes a cylindrical roller 7a formed of chloroprene rubber or silicone rubber, and a cylindrical resin roller 7b contacting the cylindrical roller 7a. Either one or both of the rollers 7a and 7b is/are rotatively driven so that the sheet conveyed through the guide plates 95 is sandwiched by the rollers 7a and 7b to be conveyed to a discharge path. Here, the pair of the conveyance rollers 7 is positioned within 210 mm from the exit of the fixing nip N1' of the fixing device 5. When the sheet having a length equal to or longer than 210 mm in the direction of conveyance of the sheet is used during the non-gloss mode, the heating roller 80 and the pressing roller 90 of the gloss imparting device 6 are separated from each other as described above. However, because the leading edge of the sheet discharging from the fixing nip N1' of the fixing device 5 reaches the pair of the conveyance rollers 7 before the trailing edge of the sheet is discharged from the fixing nip N1', the sheet can be appropriately conveyed by the pair of the conveyance rollers 7.

Because the temperature on the surface of the heating roller 80 in the gloss imparting device 6 is set to be rather lower as described above, a temperature of the sheet reaching the pair of the conveyance rollers 7 is equal to or lower than that of the sheet immediately after discharging from the fixing device 5 during the gloss mode, thereby preventing adhesion of the toner to the pair of the conveyance rollers 7 and the guide plates 95.

In the image forming apparatus 100, the gloss mode and the non-gloss mode are selectable using sheets having the same weight. For example, the gloss mode and the non-gloss mode may be displayed on a monitor of the image forming apparatus 100 so that a user can select a desired mode through the monitor. In the gloss mode, a sheet having a high degree of glossiness in a range between 30% and 50% such as coated paper is used to form a toner image thereon, and glossiness with a degree same as that of the sheet is imparted to the toner image. The gloss mode is preferably used for photogravure printing. By contrast, in the non-gloss mode, a sheet without a high degree of glossiness such as plain paper is used to form a toner image thereon, and glossiness is not imparted to the toner image.

When the gloss mode is selected, the following processes are performed by the image forming apparatus 100 using the sheet such as coated paper having a degree of glossiness in a range between 30% and 50%. It is to be noted that the processes to be described in detail below are performed by the configuration illustrated in FIG. 13.

First, the sheet having an unfixed toner image thereon is conveyed to the fixing device 5 so that the toner image is fixed to the sheet. At this time, the fixing belt 50 is heated to a temperature appropriate for fixing the toner image to the sheet by heat generated by the heater 65 provided within the heat roller 60. With regard to an amount of pressure at the fixing nip N1', the cam 78 is adjusted such that a half or more of all the width of the fixing nip N1' has a pressure in a range between 15 N/cm² and 30 N/cm². Accordingly, the toner image on the sheet after passing through the fixing device 5 is completely fixed to the sheet, and the degree of glossiness of 25% or greater is imparted to the toner image.

Curl-ups and so forth of the sheet discharged from the fixing device 5 are corrected by the pair of the guide plates 45, and the leading edge of the sheet is appropriately guided to the gloss imparting device 6.

Glossiness is further imparted to the toner image on the sheet by the gloss imparting device 6. At this time, a temperature on the surface of the heating roller 80 is set in a range between 80 C.° and 100 C.°, and a pressure at the nip N2 is adjusted by the pressure adjustment means in a range between 15 N/cm$^2$ and 30 N/cm$^2$. Accordingly, when the sheet passes through the gloss imparting device 6, heat and a predetermined amount of pressure is applied to the fixed toner image on the sheet at the nip N2, and a surface layer of the fixed tone image is leveled. As a result, the degree of glossiness of within ±15%, and more preferably within ±10%, relative to the degree of glossiness of the sheet, is imparted to the fixed toner image. The sheet discharged from the gloss imparting device 6 is then conveyed through the guide plates 95, and is discharged from the image forming apparatus 100 through the pair of the conveyance rollers 7.

By contrast, when the non-gloss mode is selected, it is confirmed whether the sheet has a length shorter than 210 mm in the direction of conveyance of the sheet or a length equal to or longer than 210 mm in the direction of conveyance of the sheet.

In a case in which the length of the sheet in the direction of conveyance of the sheet is shorter than 210 mm during the non-gloss mode, the sheet having an unfixed toner image thereon is conveyed to the fixing device 5 to fix the toner image to the sheet. At this time, the fixing belt 50 is heated to a temperature appropriate for fixing the toner image to the sheet by heat generated by the heater 65 provided within the heat roller 60. With regard to an amount of pressure at the fixing nip N1', the cam 78 is adjusted such that less than a half of all the width of the fixing nip N1' has a pressure in a range between 15 N/cm$^2$ and 30 N/cm$^2$. Accordingly, the toner image on the sheet after passing through the fixing device 5 is completely fixed to the sheet while glossiness of the toner image is not increased. Alternatively, the conditions of the fixing device 5 may be set in the manner same as those in the gloss mode depending on the type of the sheet used.

Curl-ups and so forth of the sheet discharged from the fixing device 5 are corrected by the pair of the guide plates 45, and the leading edge of the sheet is appropriately guided to the gloss imparting device 6.

In the gloss imparting device 6, the sheet is sandwiched between the heating roller 80 and the pressing roller 90 at the nip N2 to be conveyed. At this time, a temperature on the surface of the heating roller 80 is set in a range between 80 C.° and 100 C.°, and a pressure at the nip N2 is adjusted by the pressure adjustment means to be lower than that during the gloss mode. For example, the pressure at the nip N2 during the non-gloss mode is set to 5 N/cm$^2$ or lower. Accordingly, when the sheet passes through the gloss imparting device 6, heat and pressure are not applied to the fixed toner image on the sheet at the nip N2, thereby not increasing glossiness of the fixed toner image. The sheet discharged from the gloss imparting device 6 is then conveyed through the guide plates 95, and is discharged from the image forming apparatus 100 through the pair of the conveyance rollers 7.

In a case in which the non-gloss mode is selected and the length of the sheet in the direction of conveyance of the sheet is equal to or longer than 210 mm, the sheet having an unfixed toner image thereon is conveyed to the fixing device 5 to fix the toner image to the sheet. At this time, the fixing belt 50 is heated to a temperature appropriate for fixing the toner image to the sheet by heat generated by the heater 65 provided within the heat roller 60. With regard to an amount of pressure at the fixing nip N1', the cam 78 is adjusted such that less than a half of all the width of the fixing nip N1' has a pressure in a range between 15 N/cm$^2$ and 30 N/cm$^2$. Accordingly, the toner image on the sheet after passing through the fixing device 5 is completely fixed to the sheet while glossiness of the toner image is not increased.

Curl-ups and so forth of the sheet discharged from the fixing device 5 are corrected by the pair of the guide plates 45, and the leading edge of the sheet is appropriately guided to the gloss imparting device 6.

In the gloss imparting device 6, the heating roller 80 and the pressing roller 90 are separated from each other such that a gap therebetween is equal to or shorter than 2 mm, and the sheet passes therebetween. The sheet passing through the gloss imparting device 6 is then conveyed to the pair of the conveyance rollers 7 through the guide plates 95. The pair of the conveyance rollers 7 is positioned within 210 mm from the exit of the fixing nip N1' of the fixing device 5. Therefore, the leading edge of the sheet discharging from the fixing nip N1' of the fixing device 5 reaches the pair of the conveyance rollers 7 before the trailing edge of the sheet is discharged from the fixing nip N1'. Accordingly, the sheet is sandwiched by the pair of the conveyance rollers 7 and is appropriately conveyed. The sheet discharged from the pair of the conveyance rollers 7 is then discharged from the image forming apparatus 100 through the conveyance path.

As described above, in the non-gloss mode, the sheet is reliably conveyed without increasing the degree of glossiness of the toner image in the fixing device 5 and the gloss imparting device 6 regardless of the size of the sheet. Accordingly, the toner image with a desired degree of glossiness can be formed on the sheet without changing the conveyance path of the sheet in both the gloss mode and the non-gloss mode, thereby achieving downsizing of the image forming apparatus 100.

In the gloss mode, a period of time in which the sheet is pressed between the fixing roller 51 (or the fixing pad 51P) and the pressure roller 70 in the fixing device 5 is preferably 30 m/sec or more, and is more preferably 60 m/sec or more, and a period of time in which the sheet is pressed between the heating roller 80 and the pressing roller 90 in the gloss imparting device 6 is preferably 15 m/sec or more. As a result, productivity same as that achieved in the non-gloss mode can be achieved in the gloss mode, thereby providing higher productivity in both the gloss mode and the non-gloss mode.

It is to be noted that illustrative embodiments of the present invention are not limited to those described above, and various modifications and improvements are possible without departing from the scope of the present invention. It is therefore to be understood that, within the scope of the associated claims, illustrative embodiments may be practiced otherwise than as specifically described herein. For example, elements and/or features of different illustrative embodiments may be combined with each other and/or substituted for each other within the scope of the illustrative embodiments.

For example, in the driven roller unit 10 of the fixing device 5 illustrated in FIG. 1, alternatively, the detection roller 11 may be provided on an upstream side from the correction roller 12 relative to the direction of rotation of the fixing belt 50, and the correction roller 12 may be provided on a downstream side from the detection roller 11 relative to the direction of rotation of the fixing belt 50. Further, the gloss imparting device 6 may be omitted from the image forming apparatus 1 illustrated in FIGS. 12 and 13. In such a case, alternatively, a second fixing device may be provided in place of the gloss imparting device 6, and the toner image may be fixed to the sheet using both the fixing device 5 and the second fixing device.

What is claimed is:

1. A belt driving device, comprising:
    a rotatable seamless belt wound around rotatable driven rollers and one or multiple rollers; and
    a driven roller unit including the rotatable driven rollers, the driven roller unit including:
        a detection roller rotatably driven, a surface of which contacts an inner surface of the belt to slide in a direction of a rotary shaft thereof when shifting occurs on the belt in a width direction thereof, the detection roller being provided substantially on the entire belt in the width direction thereof;
        a correction roller rotatably driven, a rotary shaft of which is rotatably supported to displace around at least one point on the rotary shaft thereof while a surface thereof contacts the inner surface of the belt; and
        a conversion unit to convert displacement of the detection roller in the direction of the rotary shaft of the detection roller into angular displacement of the correction roller in a direction of rotation of the correction roller.

2. The belt driving device according to claim 1, wherein a portion of the detection roller contacting the belt comprises an elastic material.

3. The belt driving device according to claim 1, wherein the belt comprises two ribs sequentially protruding toward an inner circumference of the belt at two positions on the inner surface of the belt in the width direction thereof, and the detection roller comprises two detection rings at both ends thereof, surfaces of which contact surfaces of the two ribs, respectively, to transmit shifting of the belt in the width direction of the belt to the detection roller.

4. The belt driving device according to claim 3, wherein each of the surfaces of the two detection rings contacting each of the surfaces of the two ribs has a sloped portion, a diameter of which increases toward the detection roller.

5. The belt driving device according to claim 1, wherein the correction roller is coated with silicone rubber.

6. The belt driving device according to claim 1, wherein the angular displacement of the correction roller in the direction of rotation of the correction roller is performed on a virtual plane substantially perpendicular to a virtual plane passing through a center of rotation of the correction roller and a summit of the correction roller contacting the belt wound around the correction roller.

7. The belt driving device according to claim 1, wherein:
    when the belt and the detection roller are shifted to a first side in the width direction of the belt, the conversion member performs the angular displacement of the correction roller in the direction of rotation of the correction roller to move an end of the correction roller on a second side opposite the first side in the width direction of the belt downstream relative to a direction of rotation of the belt; and
    when the belt and the detection roller are shifted to the second side in the width direction of the belt, the conversion member performs the angular displacement of the correction roller in the direction of rotation of the correction roller to move an end of the correction roller on the first side in the width direction of the belt upstream relative to the direction of rotation of the belt.

8. A fixing device comprising the belt driving device according to claim 1, comprising:
    the belt constituting a fixing belt to fix unfixed toner to a recording medium;
    the one or multiple rollers constituting a fixing member;
    a heat member comprising a heat source provided in an inner circumference of the fixing belt to heat the fixing belt; and
    a pressure member pressed against the fixing member with the fixing belt therebetween to form a fixing nip.

9. The fixing device according to claim 8, wherein the driven rollers of the driven roller unit function as a tension roller to apply tension to the fixing belt.

10. A belt driving device, comprising:
    a rotatable seamless belt wound around rotatable driven rollers and one or multiple rollers, the belt including two ribs sequentially protruding toward an inner circumference of the belt at two positions on an inner surface of the belt in a width direction thereof; and
    a driven roller unit comprising the rotatable driven rollers, the driven roller unit including:
        a detection unit comprising two detection rings provided in the inner circumference of the belt, surfaces of which contact surfaces of the two ribs, respectively and a support shaft supporting the two detection rings to slide in a direction of the support shaft when shifting of the belt in the width direction of the belt is transmitted by the two detection rings;
        a correction roller rotatably driven, a rotary shaft of which is rotatably supported to displace around at least one point on the rotary shaft thereof while a surface thereof contacts the inner surface of the belt; and
        a conversion unit to convert displacement of the support shaft of the detection unit in the direction of the support shaft into displacement of the correction roller in a direction of rotation of the correction roller.

11. The belt driving device according to claim 10, wherein each of the surfaces of the two detection rings contacting each of the surfaces of the two ribs has a sloped portion, a diameter of which increases toward the detection unit.

12. The belt driving device according to claim 10, wherein, the detection unit comprises, between the two detection rings, a detection roller rotatably driven and having the support shaft as a rotary shaft thereof, a surface of which contacts the inner surface of the belt to slide in a direction of the rotary shaft thereof together with the support shaft when shifting occurs on the belt in the width direction thereof.

13. A fixing device comprising the belt driving device according to claim 10, comprising:
    the belt constituting a fixing belt to fix unfixed toner to a recording medium;
    the one or multiple rollers constituting a fixing member;
    a heat member comprising a heat source provided in an inner circumference of the fixing belt to heat the fixing belt; and
    a pressure member pressed against the fixing member with the fixing belt therebetween to form a fixing nip.

14. The fixing device according to claim 13, wherein the driven rollers of the driven roller unit function as a tension roller to apply tension to the fixing belt.

15. An image forming apparatus including a belt driving device, the belt driving device comprising:
    a rotatable seamless belt wound around rotatable driven rollers and one or multiple rollers; and a driven roller unit comprising the rotatable driven rollers, the driven roller unit including:
- a detection roller rotatably driven, a surface of which contacts an inner surface of the belt to slide in a direction of a rotary shaft thereof when shifting occurs on the belt in a width direction thereof, the detection roller being provided substantially on the entire belt in the width direction thereof;
- a correction roller rotatably driven, a rotary shaft of which is rotatably supported to displace around at least one point on the rotary shaft thereof while a surface thereof contacts the inner surface of the belt; and
- a conversion unit to convert displacement of the detection roller in the direction of the rotary shaft of the detection roller into angular displacement of the correction roller in a direction of rotation of the correction roller.

16. The image forming apparatus according to claim 15, wherein a portion of the detection roller contacting the belt comprises an elastic material.

17. The image forming apparatus according to claim 15, wherein the belt includes two ribs sequentially protruding toward an inner circumference of the belt at two positions on the inner surface of the belt in the width direction thereof, and the detection roller comprises two detection rings at both ends thereof, surfaces of which contact surfaces of the two ribs, respectively, to transmit shifting of the belt in the width direction of the belt to the detection roller.

18. The image forming apparatus according to claim 17, wherein each of the surfaces of the two detection rings contacting each of the surfaces of the two ribs has a sloped portion, a diameter of which increases toward the detection roller.

19. The image forming apparatus according to claim 15, wherein the correction roller is coated with silicone rubber.

20. The image forming apparatus according to claim 15, wherein:
- when the belt and the detection roller are shifted to a first side in the width direction of the belt, the conversion member performs the angular displacement of the correction roller in the direction of rotation of the correction roller to move an end of the correction roller on a second side opposite the first side in the width direction of the belt downstream relative to a direction of rotation of the belt; and
- when the belt and the detection roller are shifted to the second side in the width direction of the belt, the conversion member performs the angular displacement of the correction roller in the direction of rotation of the correction roller to move an end of the correction roller on the first side in the width direction of the belt upstream relative to the direction of rotation of the belt.

21. A belt driving device, comprising:
a rotatable seamless belt wound around rotatable driven rollers and one or multiple rollers; and
a driven roller unit including the rotatable driven rollers, the driven roller unit including:
- a detection roller rotatably driven, a surface of which contacts an inner surface of the belt to slide in a direction of a rotary shaft thereof when shifting occurs on the belt in a width direction thereof;
- a correction roller rotatably driven, a rotary shaft of which is rotatably supported to displace around at least one point on the rotary shaft thereof while a surface thereof contacts the inner surface of the belt; and
- a conversion unit to convert displacement of the detection roller in the direction of the rotary shaft of the detection roller into angular displacement of the correction roller in a direction of rotation of the correction roller,
wherein the belt comprises two ribs sequentially protruding toward an inner circumference of the belt at two positions on the inner surface of the belt in the width direction thereof, and the detection roller comprises two detection rings at both ends thereof, surfaces of which contact surfaces of the two ribs, respectively, to transmit shifting of the belt in the width direction of the belt to the detection roller.

22. An image forming apparatus including a belt driving device, the belt driving device comprising:
a rotatable seamless belt wound around rotatable driven rollers and one or multiple rollers; and
a driven roller unit comprising the rotatable driven rollers, the driven roller unit including:
- a detection roller rotatably driven, a surface of which contacts an inner surface of the belt to slide in a direction of a rotary shaft thereof when shifting occurs on the belt in a width direction thereof,
- a correction roller rotatably driven, a rotary shaft of which is rotatably supported to displace around at least one point on the rotary shaft thereof while a surface thereof contacts the inner surface of the belt; and
- a conversion unit to convert displacement of the detection roller in the direction of the rotary shaft of the detection roller into angular displacement of the correction roller in a direction of rotation of the correction roller,
wherein the belt includes two ribs sequentially protruding toward an inner circumference of the belt at two positions on the inner surface of the belt in the width direction thereof, and the detection roller includes two detection rings at both ends thereof, surfaces of which contact surfaces of the two ribs, respectively, to transmit shifting of the belt in the width direction of the belt to the detection roller.

* * * * *